US008874706B2

(12) United States Patent
Treadwell et al.

(10) Patent No.: US 8,874,706 B2
(45) Date of Patent: Oct. 28, 2014

(54) QUARANTINE TOOL

(75) Inventors: William Scott Treadwell, Richardson, TX (US); Daniel P. Shnowske, Waxahachie, TX (US); Kenneth Kaye, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 584 days.

(21) Appl. No.: 12/847,396

(22) Filed: Jul. 30, 2010

(65) Prior Publication Data

US 2011/0219103 A1 Sep. 8, 2011

Related U.S. Application Data

(60) Provisional application No. 61/309,505, filed on Mar. 2, 2010.

(51) Int. Cl.
*G06F 15/177* (2006.01)
*H04L 29/06* (2006.01)
*G06F 21/55* (2013.01)

(52) U.S. Cl.
CPC .......... *H04L 63/1416* (2013.01); *G06F 21/554* (2013.01); *H04L 63/102* (2013.01)
USPC .......... 709/222

(58) Field of Classification Search
USPC .......... 709/222
See application file for complete search history.

(56) References Cited

U.S. PATENT DOCUMENTS 7,925,729 B2 * 4/2011 Bush et al. .......... 709/223
2003/0191966 A1 10/2003 Gleichauf
2005/0172142 A1 8/2005 Shelest et al.
2006/0101409 A1 * 5/2006 Bemmel .......... 717/126
2006/0130139 A1 * 6/2006 Sobel et al. .......... 726/22
2006/0203815 A1 * 9/2006 Couillard .......... 370/389
2007/0055752 A1 3/2007 Wiegand et al.
2007/0118567 A1 5/2007 Isokawa
2007/0271363 A1 * 11/2007 Ross et al. .......... 709/223
2008/0102867 A1 5/2008 Olsson et al.
2010/0017597 A1 1/2010 Chandwani
2010/0106824 A1 * 4/2010 Friedrich et al. .......... 709/224

OTHER PUBLICATIONS

Rankin N. Thompson et al, “The D825 Automatic Operating and Scheduling Program”, May 1963, ACM, p. 41-49.*

(Continued)

*Primary Examiner* — Ryan Jakovac

(74) *Attorney, Agent, or Firm* — Michael A. Springs; Moore & Van Allen PLLC; Jeffrey R. Gray

(57) ABSTRACT

Described herein are apparatuses, methods, and computer program products for quarantining an out of compliance client device from other client devices on a network. Quarantining the out of compliance client device prevents the out of compliance device from corrupting other client devices on the network. For example, in operation, embodiments of the present invention involve: (1) receiving identification and location information for an out of compliance client device; (2) running a tool that utilizes the identification and location information to access the out of compliance device; (3) using the tool to modify the out of compliance device such that the out of compliance client device broadcasts a request for configuration information to which a network server is programmed to respond with configuration information associated with an isolated network; and (4) using the tool to cause the out of compliance client device to logout of the network. When the device logs back into the network, the network server responds by directing the device to the isolated network.

41 Claims, 15 Drawing Sheets

CONFIGURATION INFORMATION DATABASE 116
NETWORK SERVER 112
100
CLIENT DEVICE 108a
CLIENT DEVICES 108
OPERATING NETWORK 104
ISOLATED NETWORK 124
QUARANTINE TOOL 120
COMPLIANCE TOOL 128
OUT-OF-COMPLIANCE CLIENT DEVICE DATABASE 132

CONFIGURATION INFORMATION DATABASE 116
NETWORK SERVER 112
100
CLIENT DEVICE 108a
CLIENT DEVICES 108
OPERATING NETWORK 104
ISOLATED NETWORK 124
QUARANTINE TOOL 120
COMPLIANCE TOOL 128
OUT-OF-COMPLIANCE CLIENT DEVICE DATABASE 132

(56) References Cited

OTHER PUBLICATIONS

G. Stump et al, "The User Class Option for DHCP", Nov. 2000, Network Working Group.*
International Search Report and Written Opinion for International Patent Application No. PCT/US 11/26847 mailed Apr. 26, 2011.
International Search Report and Written Opinion for International Patent Application No. PCT/US 11/26854 mailed Apr. 29, 2011.
International Preliminary Report on Patentability for International Application No. PCT/US2011/026847 mailed Sep. 13, 2012.
International Preliminary Report on Patentability for International Application No. PCT/US2011/026854 mailed Sep. 13, 2012.

* cited by examiner

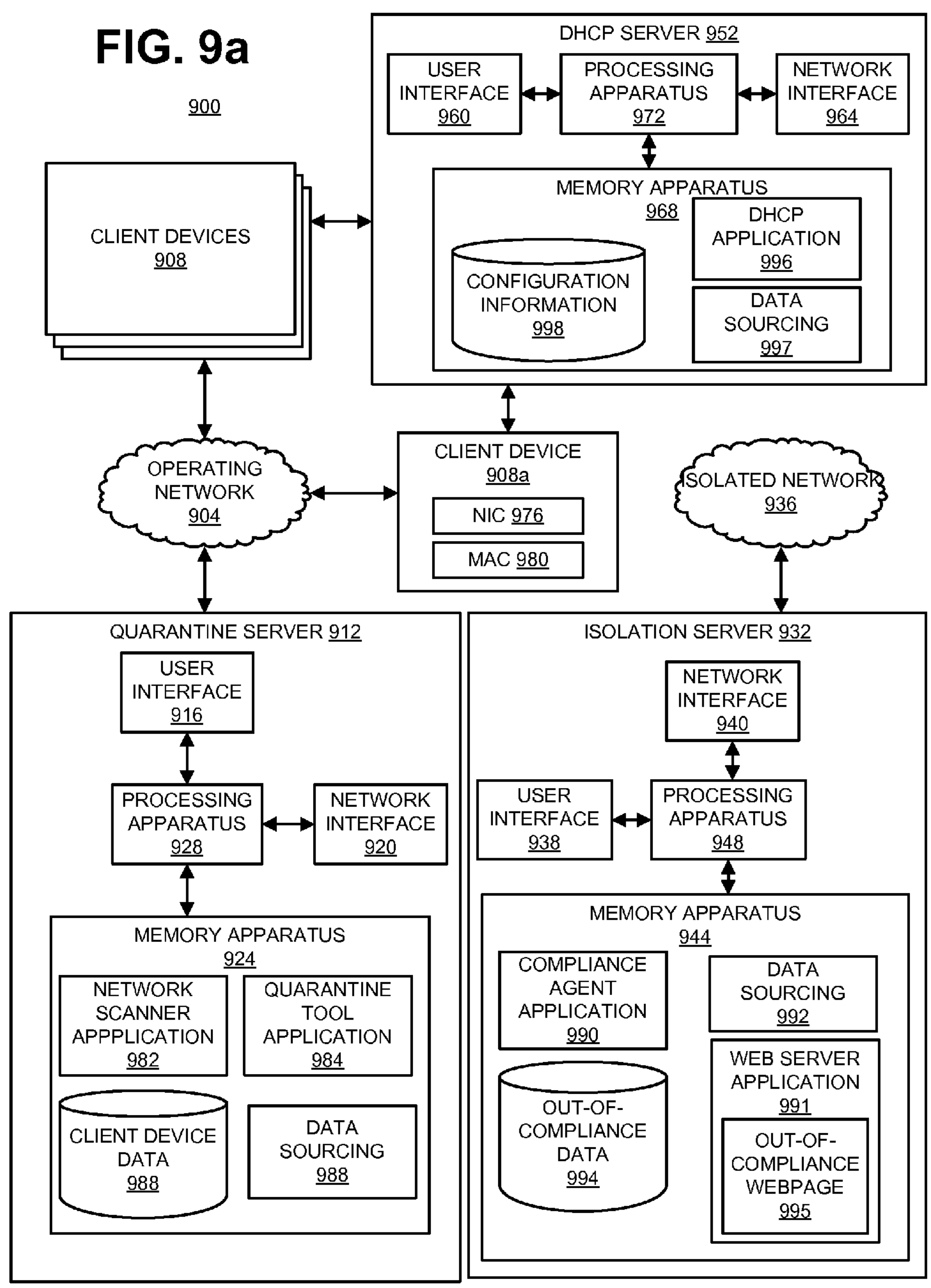
FIG. 9a
900
CLIENT DEVICES 908
DHCP SERVER 952
USER INTERFACE 960
PROCESSING APPARATUS 972
NETWORK INTERFACE 964
MEMORY APPARATUS 968
DHCP APPLICATION 996
CONFIGURATION INFORMATION 998
DATA SOURCING 997
OPERATING NETWORK 904
CLIENT DEVICE 908a
NIC 976
MAC 980
ISOLATED NETWORK 936
QUARANTINE SERVER 912
USER INTERFACE 916
PROCESSING APPARATUS 928
NETWORK INTERFACE 920
MEMORY APPARATUS 924
NETWORK SCANNER APPPLICATION 982
QUARANTINE TOOL APPLICATION 984
CLIENT DEVICE DATA 988
DATA SOURCING 988
ISOLATION SERVER 932
NETWORK INTERFACE 940
USER INTERFACE 938
PROCESSING APPARATUS 948
MEMORY APPARATUS 944
COMPLIANCE AGENT APPLICATION 990
DATA SOURCING 992
WEB SERVER APPLICATION 991
OUT-OF-COMPLIANCE DATA 994
OUT-OF-COMPLIANCE WEBPAGE 995

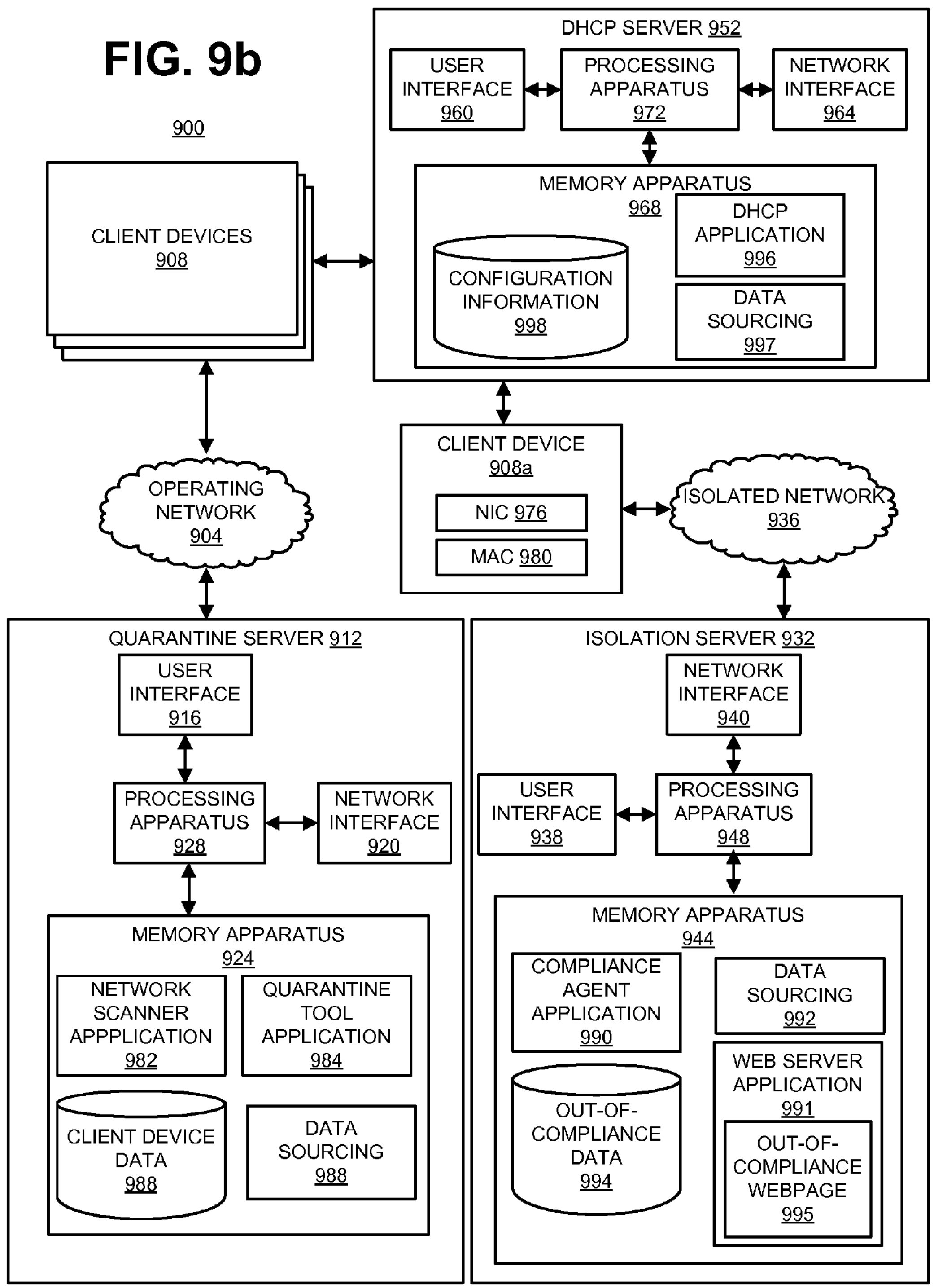
FIG. 9b
900
DHCP SERVER 952
USER INTERFACE 960
PROCESSING APPARATUS 972
NETWORK INTERFACE 964
MEMORY APPARATUS 968
DHCP APPLICATION 996
CONFIGURATION INFORMATION 998
DATA SOURCING 997
CLIENT DEVICES 908
CLIENT DEVICE 908a
NIC 976
MAC 980
OPERATING NETWORK 904
ISOLATED NETWORK 936
QUARANTINE SERVER 912
USER INTERFACE 916
PROCESSING APPARATUS 928
NETWORK INTERFACE 920
MEMORY APPARATUS 924
NETWORK SCANNER APPPLICATION 982
QUARANTINE TOOL APPLICATION 984
CLIENT DEVICE DATA 988
DATA SOURCING 988
ISOLATION SERVER 932
NETWORK INTERFACE 940
USER INTERFACE 938
PROCESSING APPARATUS 948
MEMORY APPARATUS 944
COMPLIANCE AGENT APPLICATION 990
DATA SOURCING 992
WEB SERVER APPLICATION 991
OUT-OF-COMPLIANCE DATA 994
OUT-OF-COMPLIANCE WEBPAGE 995

QUARANTINE TOOL

CROSS REFERENCE TO RELATED APPLICATIONS

This application claims benefit of priority under 35 U.S.C. §119(e) to the filing date of U.S. Provisional Application No. 61/309,505, as filed on Mar. 2, 2010, which is incorporated herein by reference in its entirety.

FIELD

In general, embodiments of the present invention relate to apparatuses, methods, and computer program products for quarantining an out of compliance client device from other client devices on a network.

BACKGROUND

A computer virus can spread across a network from an infected client device to other client devices on the network. Accordingly, if one client device on the network is vulnerable, then a virus could exploit that vulnerability and infect the vulnerable client device, which may then spread the virus over the network to the other client devices. Accordingly, systems and methods are needed to identify vulnerable client devices on a network and quarantine those vulnerable client devices to prevent harm to other client devices and servers on the network. After the vulnerable client devices have been quarantined, systems and methods are needed to make the devices compliant and allow them back on the network.

BRIEF SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to apparatuses, methods, and computer program products for quarantining an out of compliance client device from other client devices on an operating network. By quarantining the out of compliance client device, the present invention prevents the out of compliance device from corrupting other client devices on the operating network. For example, in operation, at least one embodiment of the present invention involves: (1) receiving identification and location information for an out of compliance client device; (2) running a tool that utilizes the identification and location information to access the out of compliance device; (3) using the tool to modify the out of compliance device such that the out of compliance client device broadcasts a request for configuration information to which a network server is programmed to respond with configuration information associated with an isolated network; and (4) using the tool to cause the out of compliance client device to logout of the operating network. When the out of compliance device, in an attempt to log back into the operating network, broadcasts a request for configuration information, the network server responds with configuration information for the isolated network. By modifying out of compliance client device's broadcast request such that the out of compliance client device cannot obtain configuration information for the operating network and by causing the out of compliance client device to log out of the operating network, the present invention quarantines the out of compliance client device from the operating network.

Once the out of compliance client device is quarantined from having access to the operating network a compliance tool can be applied to make the out of compliance client device compliant again. For example, in operation, embodiments of the present invention involve: (1) utilizing a compliance tool to bring an out of compliance client device into compliance; (2) using the compliance tool to modify the client device when the client device is brought into compliance, such that the client device broadcasts a request for configuration information to which a network server is programmed to respond with configuration information associated with the operating network; and (3) using the compliance tool to cause the client device that has been brought into compliance to logout of the isolated network. In some embodiments of the invention the compliance tool is a compliance tool that identifies the location of the out of compliance client device remotely, determines why the out of compliance client device is out of compliance, brings the out of compliance client device into compliance, and modifies the client device to allow it to access the operating network again. In other embodiments of the invention the compliance tool is a compliance agent, wherein at least of part of the compliance agent is uploaded on the out of compliance client device itself. The compliance agent periodically checks the out of compliance client device to determine if the out of compliance client device has been brought into compliance, and when it is brought into compliance the compliance agent modifies the client device to allow it to access the operating network again. Thereafter the compliance agent is uninstalled from the client device.

One embodiment of the invention is a system for quarantining an out of compliance client device from other client devices on an operating network, the system comprising, a memory device, a communication device, and a first processing device operatively coupled to the memory device and the communication device. The first processing device is configured to execute computer-readable program code associated with a quarantine tool to access the out of compliance client device via the operating network. The quarantine tool comprises computer readable program code configured when performed by said first processing device to cause said first processing device to cause the out of compliance client device to broadcast a request for configuration information associated with an isolated network and cause the out of compliance client device to logout of the operating network.

In further accord with an embodiment of the invention, wherein the quarantine tool comprises computer readable program code that when performed by said first processing device causes said first processing device to cause the out of compliance client device to logout of the operating network by restarting a network interface of the client device.

In another embodiment of the invention, wherein the quarantine tool comprises computer readable program code that when performed by said first processing device causes said first processing device to cause the out of compliance client device to broadcast the request for configuration information associated with an isolated network is further configured to cause the out of compliance client device to thereafter receive configuration information associated with the isolated network from a network server configured to respond to the broadcast request.

In yet another embodiment of the invention, wherein the quarantine tool comprises computer readable program code that when performed by said first processing device causes said first processing device to cause a modification in the out of compliance client device by adding or changing a Class ID to or in the network interface of the out of compliance client device such that the out of compliance client device broadcasts a request for configuration information, wherein the broadcasted request includes the Class ID, and whereby the out of compliance device thereafter receives an IP address from a pool of IP addresses associated with the isolated network from a network server configured to respond to the broadcast request.

In still another embodiment of the invention, the system further comprises a second processing device configured to execute computer-readable program code associated with a compliance tool to cause said second processing device to bring the out of compliance client device into compliance via an isolated network. The compliance tool comprises computer readable program code configured when performed by said second processing device to determine that an out of compliance client device is now a compliant client device. The compliance tool also comprises computer readable program code configured when performed by said second processing device to cause the compliant client device to broadcast a request for configuration information to connect to the operating network. The compliance tool further comprises computer readable program code configured when performed by said second processing device to cause the compliant client device to logout of the isolated network.

In further accord with an embodiment of the invention, computer readable program code that when performed by said second processing device causes said second processing device to add the out of compliance client device to a log of out of compliance devices when the out of compliance client device cannot be made compliant.

In another embodiment of the invention, computer readable program code that when performed by said second processing device causes said second processing device to (1) access the log of out of compliance client devices; (2) retrieve identification information for each out of compliance client device listed in the log of out of compliance devices and that are quarantined from the operating network; (3) utilize the identification information to access each out of compliance client device listed in the log of out of compliance devices; (4) identify one or more client devices listed in the log of out of compliance devices that has been changed into the compliant client device; (5) cause the compliant client device to broadcast a request for configuration information associated with the operating network; and (6) log the compliant client device out of the isolated network.

In yet another embodiment of the invention, the compliance tool is a compliance agent, wherein at least portions thereof are installed on the out of compliance client device.

In still another embodiment of the invention, the compliance agent comprises computer readable program code that when performed by said second processing device causes said second processing device to evaluate the out of compliance client device to determine if it has been brought into compliance.

In further accord with an embodiment of the invention, the compliance agent comprises computer readable program code that when performed by said second processing device causes said second processing device to uninstall the compliance agent once the out of compliance client device has been made compliant.

In another embodiment of the invention, the compliance agent comprises computer readable program code that when performed by said second processing device causes said second processing device to cause the compliant client device to broadcast the request for configuration information associated with the operating network is further configured to cause the compliant client device to thereafter receive configuration information associated with the operating network from a network server configured to respond to the broadcast request.

In yet another embodiment of the invention, the compliance agent comprises computer readable program code that when performed by said second processing device causes said second processing device to cause a modification in the compliant client device by removing or changing a Class ID from or on the network interface of the compliant client device such that the compliant client device broadcasts a request for configuration information, wherein the broadcasted request either does not include the Class ID or includes the changed Class ID, and whereby the compliant client device thereafter receives an IP address from a pool of IP addresses associated with the operating network from a network server configured to respond to the broadcast request.

In still another embodiment of the invention, the compliance tool comprises computer readable program code that when performed by said second processing device causes said second processing device to cause the client device that has been brought into compliance to logout of the isolated network by restarting a network interface of the client device.

In further accord with an embodiment of the invention, the compliance tool comprises computer readable program code that when performed by said second processing device causes said second processing device to receive notification that the out of compliance client device is out of compliance when the out of compliance client device accesses the isolated network.

In another embodiment of the invention, the compliance tool comprises computer readable program code that when performed by said second processing device causes said second processing device to receive identification and location information for the out of compliance client device. In further accord with this embodiment, the second processing device configured to execute computer-readable program code to utilize a compliance tool comprises utilizing the identification and location information to access the out of compliance client device.

In yet another embodiment the compliance tool comprises computer readable program code that when performed by said second processing device causes said second processing device to tag the out of compliance client device as a rogue device if the quarantine tool is unable to access the out of compliance client device.

In still another embodiment of the invention, first and second processing devices are embodied by the same processing device.

In further accord with an embodiment of the invention, a third processing device configured to execute computer-readable program code associated with the compliance agent that is at least partially installed on the out of compliance client device, wherein the third processing device is configured to execute the portions of the compliance agent that are installed on the out of compliance client device.

Another embodiment of the invention is a method for quarantining an out of compliance client device from other client devices on an operating network, the method comprising causing the out of compliance client device to broadcast a request for configuration information associated with an isolated network, through the use of a processor. The method further comprising causing the out of compliance client device to logout of the operating network, through the use of the processor.

In further accord with an embodiment of the invention, causing the out of compliance client device to logout of the operating network comprises restarting a network interface of the client device.

In another embodiment of the invention, the method further comprises causing the out of compliance client device to receive configuration information associated with the isolated network from a network server configured to respond to the broadcast request, through the use of the processor.

In yet another embodiment of the invention, the method further comprises causing a modification in the out of compliance client device by adding or changing a Class ID to or in the network interface of the out of compliance client device such that the out of compliance client device broadcasts a request for configuration information, through the use of the processor, wherein the broadcasted request includes the Class ID, and whereby the out of compliance device thereafter receives an IP address from a pool of IP addresses associated with the isolated network from a network server configured to respond to the broadcast request.

In still another embodiment of the invention, the method further comprises determining that an out of compliance client device is now a compliant client device, through the use of the processor. The method also comprises causing the compliant client device to broadcast a request for configuration information to connect to the operating network, through the use of the processor. The method further comprises causing the compliant client device to logout of the isolated network, through the use of the processor.

In further accord with an embodiment of the invention, the method further comprises adding the out of compliance client device to a log of out of compliance devices when the out of compliance client device cannot be made compliant, through the use of the processor.

In another embodiment of the invention, the method further comprises (1) accessing the log of out of compliance client devices, through the use of the processor; (2) retrieving identification information for each out of compliance client device listed in the log of out of compliance devices and that are quarantined from the operating network, through the use of the processor; (3) utilizing the identification information to access each out of compliance client device listed in the log of out of compliance devices, through the use of the processor; (4) identifying one or more client devices listed in the log of out of compliance devices that has been changed into the compliant client device, through the use of the processor; (5) causing the compliant client device to broadcast a request for configuration information associated with the operating network, through the use of the processor; and (6) logging the compliant client device out of the isolated network, through the use of the processor.

In yet another embodiment of the invention, the method further comprises evaluating the out of compliance client device to determine if it has been brought into compliance, through the use of the processor.

In still another embodiment of the invention, the method further comprises causing the compliant client device to receive configuration information associated with the operating network from a network server configured to respond to the broadcast request, through the use of the processor.

In further accord with an embodiment of the invention, the method further comprises causing a modification in the compliant client device by removing or changing a Class ID from or on the network interface of the compliant client device such that the compliant client device broadcasts a request for configuration information, through the use of a processor, wherein the broadcasted request either does not include the Class ID or includes the changed Class ID, and whereby the compliant client device thereafter receives an IP address from a pool of IP addresses associated with the operating network from a network server configured to respond to the broadcast request.

In another embodiment of the invention, causing the client device that has been brought into compliance to logout of the isolated network comprises restarting a network interface of the client device.

In yet another embodiment of the invention, the method further comprises receiving notification that the out of compliance client device is out of compliance when the out of compliance client device accesses the isolated network, through the use of the processor.

In still another embodiment of the invention, the method further comprises receiving identification and location information for the out of compliance client device, through the use of the processor and utilizing the identification and location information to access the out of compliance client device, through the use of the processor.

In further accord with an embodiment of the invention, the method further comprises tagging the out of compliance client device as a rogue device if out of compliance client device cannot be accessed, through the use of the processor.

In another embodiment of the invention, the processor is more than one processor.

One embodiment of the invention is a computer program product for a system for quarantining an out of compliance client device from other client devices on a network, the computer program product comprising at least one non-transitory computer-readable medium having computer-readable program code portions embodied therein. The computer-readable program code portions comprising an executable portion configured for causing the out of compliance client device to broadcast a request for configuration information associated with an isolated network and an executable portion configured for causing the out of compliance client device to logout of the operating network.

In further accord with an embodiment if the invention, the executable portion configured for causing the out of compliance client device to logout of the operating network comprises restarting a network interface of the client device.

In another embodiment of the invention, the computer program product further comprises an executable portion configured for causing the out of compliance client device to receive configuration information associated with the isolated network from a network server configured to respond to the broadcast request.

In yet another embodiment of the invention, the computer program product further comprises an executable portion configured for causing a modification in the out of compliance client device by adding or changing a Class ID to or in the network interface of the out of compliance client device such that the out of compliance client device broadcasts a request for configuration information, wherein the broadcasted request includes the Class ID, and whereby the out of compliance device thereafter receives an IP address from a pool of IP addresses associated with the isolated network from a network server configured to respond to the broadcast request.

In still another embodiment of the invention, the computer program product further comprises an executable portion configured for determining that an out of compliance client device is now a compliant client device, through the use of the processor. The computer program product further comprises an executable portion configured for causing the compliant client device to broadcast a request for configuration information to connect to the operating network, through the use of the processor. The computer program product also comprises an executable portion configured for causing the compliant client device to logout of the isolated network, through the use of the processor.

In further accord with an embodiment of the invention, the computer program product further comprises an executable portion configured for adding the out of compliance client device to a log of out of compliance devices when the out of compliance client device cannot be made compliant.

In another embodiment of the invention, the computer program product further comprises (1) an executable portion configured for accessing the log of out of compliance client devices; (2) an executable portion configured for retrieving identification information for each out of compliance client device listed in the log of out of compliance devices and that are quarantined from the operating network; (3) an executable portion configured for utilizing the identification information to access each out of compliance client device listed in the log of out of compliance devices; (4) an executable portion configured for identifying one or more client devices listed in the log of out of compliance devices that has been changed into the compliant client device; (5) an executable portion configured for causing the compliant client device to broadcast a request for configuration information associated with the operating network; and (6) an executable portion configured for logging the compliant client device out of the isolated network.

In yet another embodiment of the invention, the computer program product further comprises an executable portion configured for evaluating the out of compliance client device to determine if it has been brought into compliance, through the use of the processor.

In still another embodiment of the invention, the computer program product further comprises an executable portion configured for causing the compliant client device to receive configuration information associated with the operating network from a network server configured to respond to the broadcast request.

In further accord with another embodiment of the invention, the computer program product further comprises an executable portion configured for causing a modification in the compliant client device by removing or changing a Class ID from or on the network interface of the compliant client device such that the compliant client device broadcasts a request for configuration information, wherein the broadcasted request either does not include the Class ID or includes the changed Class ID, and whereby the compliant client device thereafter receives an IP address from a pool of IP addresses associated with the operating network from a network server configured to respond to the broadcast request.

In another embodiment of the invention, the executable portion configured for causing the client device that has been brought into compliance to logout of the isolated network by restarting a network interface of the client device.

In yet another embodiment of the invention, the computer program product further comprises an executable portion configured for receiving notification that the out of compliance client device is out of compliance when the out of compliance client device accesses the isolated network.

In still another embodiment of the invention, the computer program product further comprises an executable portion configured for receiving identification and location information for the out of compliance client device, and an executable portion configured for utilizing the identification and location information to access the out of compliance client device.

In further accord with another embodiment of the invention, the computer program product further comprises an executable portion configured for tagging the out of compliance client device as a rogue device if out of compliance client device cannot be accessed.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Reference will now be made to the accompanying drawings to describe some embodiments of the invention, wherein:

FIG. 9*a* provides a block diagram illustrating another exemplary environment in which exemplary processes described herein are implemented for identifying, quarantining, and restoring out of compliance client devices, in accordance with an embodiment of the invention;

FIG. 9*b* provides a block diagram illustrating the exemplary environment of FIG. 9*a*, where an out of compliance client device is connected to an isolated network and quarantined from other client devices, in accordance with an embodiment of the invention;

DETAILED DESCRIPTION OF EMBODIMENTS OF THE INVENTION

Figure 1A:
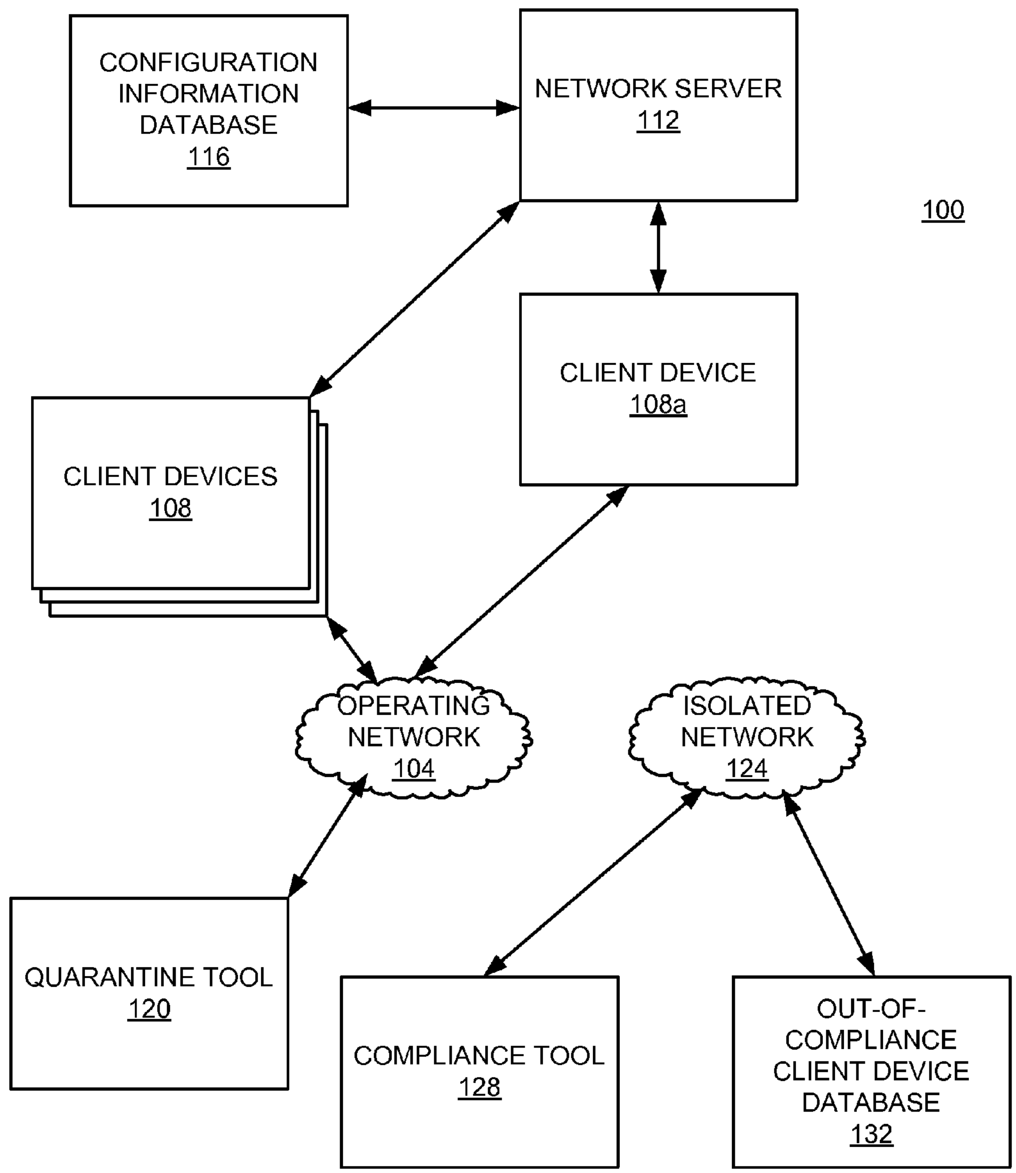
FIG. 1*a* provides a block diagram illustrating an exemplary environment in which exemplary processes described herein are implemented for identifying, quarantining, and restoring out of compliance client devices, in accordance with an embodiment of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function. It is to be understood that the general terms "processors," "processing device," and "processing apparatus" executing one or more computer-executable program code portions may be interchangeable and may be embodied in one processor, processing device, or processing apparatus, or may be embodied in multiple processors, processing devices, or processing apparatuses. In some embodiments wherein a tool or agent, or portion of a tool or agent, is located on a device the processor for that device will execute the one or more computer-executable program code portions of the tool or agent, or portion of a tool or agent, located on the device. In other embodiments of the invention the processor for a device can execute the one or more computer-executable program code portions of a tool or agent, or portion of a tool or agent, located on another device.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of apparatuses, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

Figure 1B:
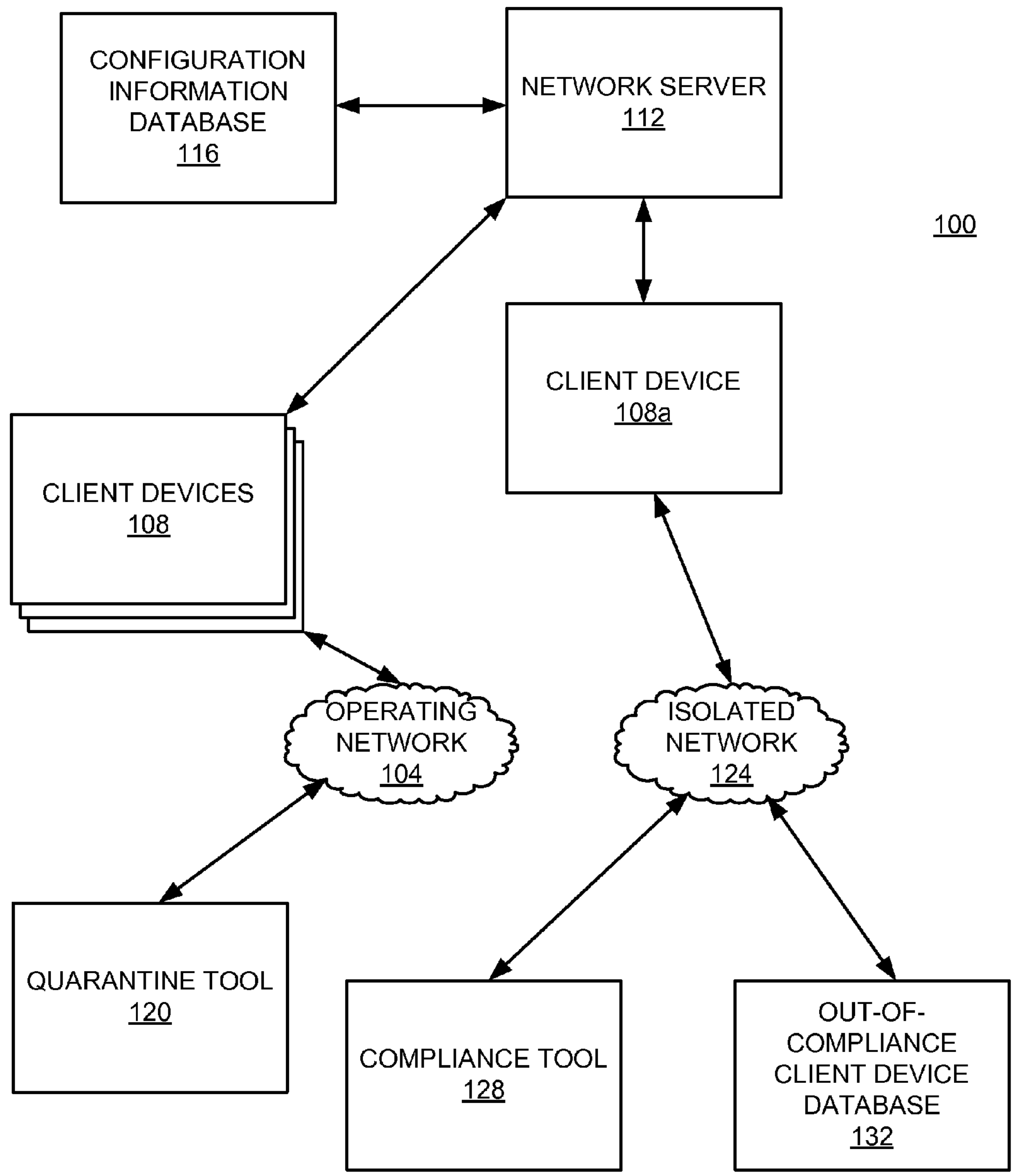
FIG. 1*b* provides a block diagram illustrating the exemplary environment of FIG. 1*a*, where an out of compliance client device is connected to an isolated network and quarantined from other client devices, in accordance with an embodiment of the invention.

FIGS. 1*a* and 1*b* provide block diagrams illustrating an environment 100 in which the systems, methods, and/or computer program products described herein for quarantining an out of compliance client device are implemented, in accordance with one or more embodiments of the invention. The environment 100 includes a plurality of servers and devices in communication with one another over a communication operating network, as would exist, for example, in a company's information technology operating environment. As illustrated in FIGS. 1*a* and 1*b*, the environment 100 includes an operating network 104 that interconnects a plurality of client devices 108. A quarantine tool 120 is provided in communication with the operating network 104. Further, an exemplary client device 108*a* selected from among the plurality of client devices 108 is provided in communication with a network server 112, which is in communication with a configuration information database 116. According to the illustrated embodiment, the environment 100 further includes an isolated network 124 that interconnects a compliance tool 128 and an out of compliance client device database 132. In FIG. 1*a*, the client device 108*a* is in communication with the operating network 104. Accordingly, in FIG. 1*a*, the client device 108*a* is connected to the operating network 104, which allows for communication between the client device 108*a* and the other client devices 108 and the quarantine tool 120. However, in FIG. 1*b*, the client device 108*a* has been determined to be out of compliance. It has thus been connected to the isolated network 124, not the operating network 104. Accordingly, in FIG. 1*b*, the client device 108*a* is quarantined from the operating network 104 and unable to communicate with the other client devices 108 on the network 104.

As used herein, the terms operating network and isolated network are not to be limited by the terms operating and isolated. Both the operating network and isolated network may be various types of networks that allow devices to communicate with one another. The use of the terms operating and isolated are used to illustrate two separate networks in which out of compliance devices on a first network can be isolated from other devices on the first network by directing the out of compliance devices to connect to a second network. It is to be understood that at any particular time both out of compliance devices and/or compliant devices can be located on both the operating network and/or the isolated network.

Although, for simplicity, FIGS. 1*a* and 1*b* only illustrate one of each device, it will be appreciated that, in some embodiments of the invention, there may be two or more of the client devices 108*a*, network servers 112, quarantine tools 120, compliance tools 128, and/or databases 116, 132. Also, although the quarantine tool 120 and the compliance tool 128 are illustrated as separate tools, as described in more detail below, it should be appreciated that the quarantine tool 120 and the compliance tool 128 can in some embodiments be combined into a single tool.

Figure 2:
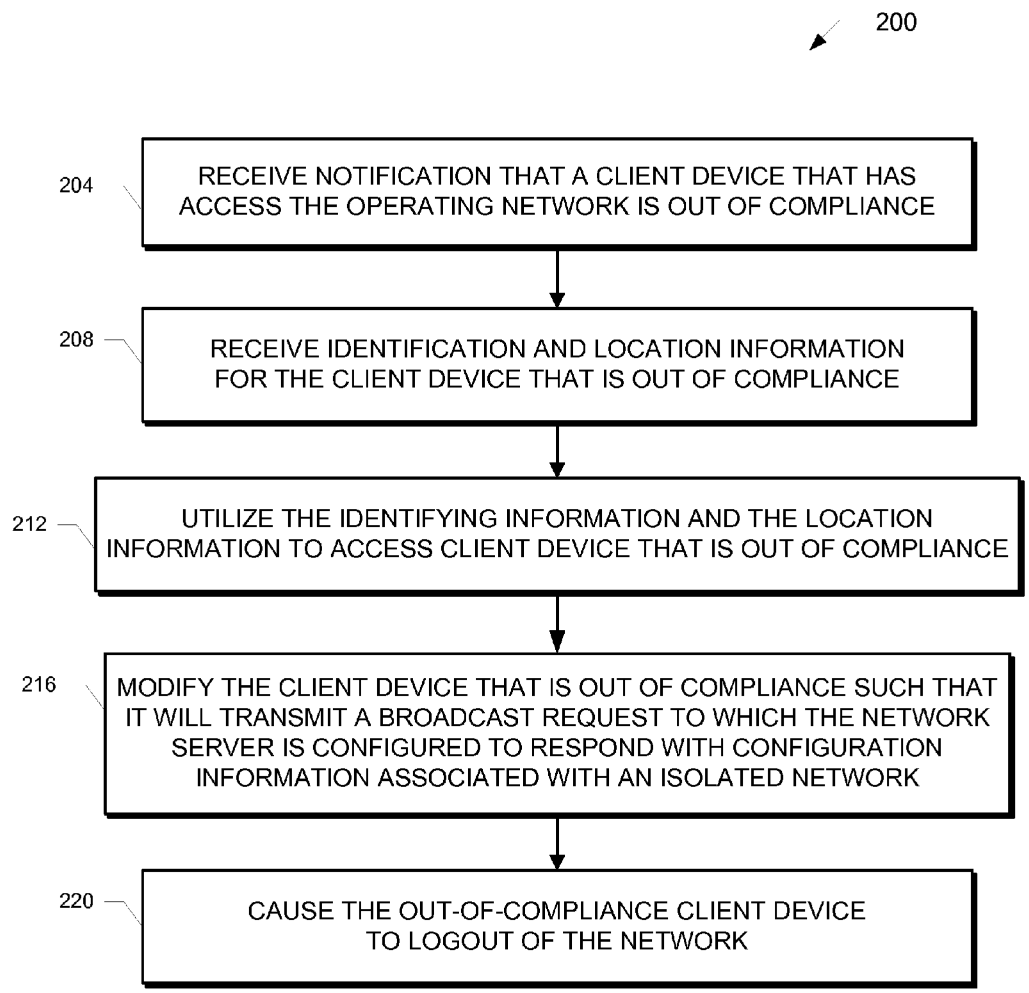
FIG. 2 provides a flow diagram illustrating an exemplary quarantining process implemented in the exemplary environment of FIGS. 1*a* and 1*b*, in accordance with an embodiment of the present invention.

FIG. 2 provides a flow diagram illustrating an exemplary quarantining process 200 for implementation in the environment 100 of FIGS. 1*a* and 1*b*, in accordance with an embodiment of the present invention. As illustrated in FIG. 2, the exemplary process 200, as represented at block 204, generally begins with receiving notification that the client device 108*a* is out of compliance. There exists a plurality of apparatuses, systems, and methods for identifying the client devices 108 that are out of compliance. In some embodiments, compliance is determined manually. In other embodiments, compliance is determined automatically. One example for determining compliance is provided below with reference to FIG. 8.

As used herein, a device that is "out of compliance" is any device that fails to conform to a particular standard, requirement, preference, or other specification. Such a specification may relate to the device's hardware, software, access, use, and/or the like. A client device may be out of compliance if it, for example, but not limited to: (1) lacks certain patches or software, e.g., antivirus software; (2) has particular software that it is not supposed to have, e.g., a virus or unauthorized software; (3) has been used in a suspicious manner; (4) has access to or has already accessed a restricted area; (5) has particular hardware or unauthorized hardware; or (6) has an improper combination of software and/or access rights, etc.

Next, as represented by block 208, the exemplary process 200 includes receiving identification information and location information for the client device 108*a*, which, as illustrated in FIG. 1*a*, is on the operating network 104. Then, as represented by block 212, the identification information and the location information are utilized to access the client device 108*a* on the operating network 104. According to the illustrated embodiment, the identification information and the location information are provided to the quarantine tool 120, which is configured to utilize that information to locate and access the client device 108*a* on the operating network 104.

Next, as represented by block 216, the process 200 involves, via the quarantine tool 120, modifying the client device 108*a*, which has been identified as being out of compliance, such that the client device 108*a* is thereafter configured to transmit a broadcast request that will cause the network server 112 to respond with configuration information associated with the isolated network 124. According to the illustrated embodiment, the quarantine tool 120 modifies the client device 108*a* according to the step represented by block 216. In particular, according to the illustrated embodiment, the quarantine tool 120, after accessing the client device 108*a* pursuant to the step represented by block 212, modifies the client device 108*a* such that the client device 108*a* is configured to transmit a broadcast request associated with configuration information in the configuration information database 116 that corresponds to the isolated network 124. After modifying the client device, the process 200 involves causing the client device 108*a* to log out of the operating network 104. According to an embodiment, to cause the client device 108*a* to log out of the operating network 104, the quarantine tool 120 is configured to restart the network interface of the client device 108*a*.

When the client device 108*a* attempts to reconnect to the operating network 104, it transmits the modified broadcast request to the network server 112, which then searches the configuration information database 116 and identifies configuration information that matches the modified broadcast request. The network server 112 then replies to client device 108*a* with the configuration information that matches the modified broadcast request. However, according to the illustrated embodiment, the configuration information that matches the modified broadcast request is associated with the isolated network 124, not the operating network 104. Accordingly, the client device is unable to connect to the operating network 104 and instead connects to the isolated network 124, as illustrated in FIG. 1*b* using generally known procedures for connecting a network device to a network.

In sum, according to the illustrated embodiment, the configuration information that the network server 112 provides to the client device 108*a*, after the client device has been modified because it was identified as being out of compliance, will not permit the client device 108*a* to log into the operating network 104. Instead, according to the illustrated embodiment, the configuration information will instead enable the client device 108*a* to log into the isolated network 124. As discussed later below with regard to FIG. 10*a*, in some embodiments, if the quarantine tool 120 is unable to log into to the client device, the quarantine tool may tag the client device as being a rogue device that does not have authorization to access the operating network 104 and thus subject to removal from the operating network 104 by, for example, manual means.

Figure 3:
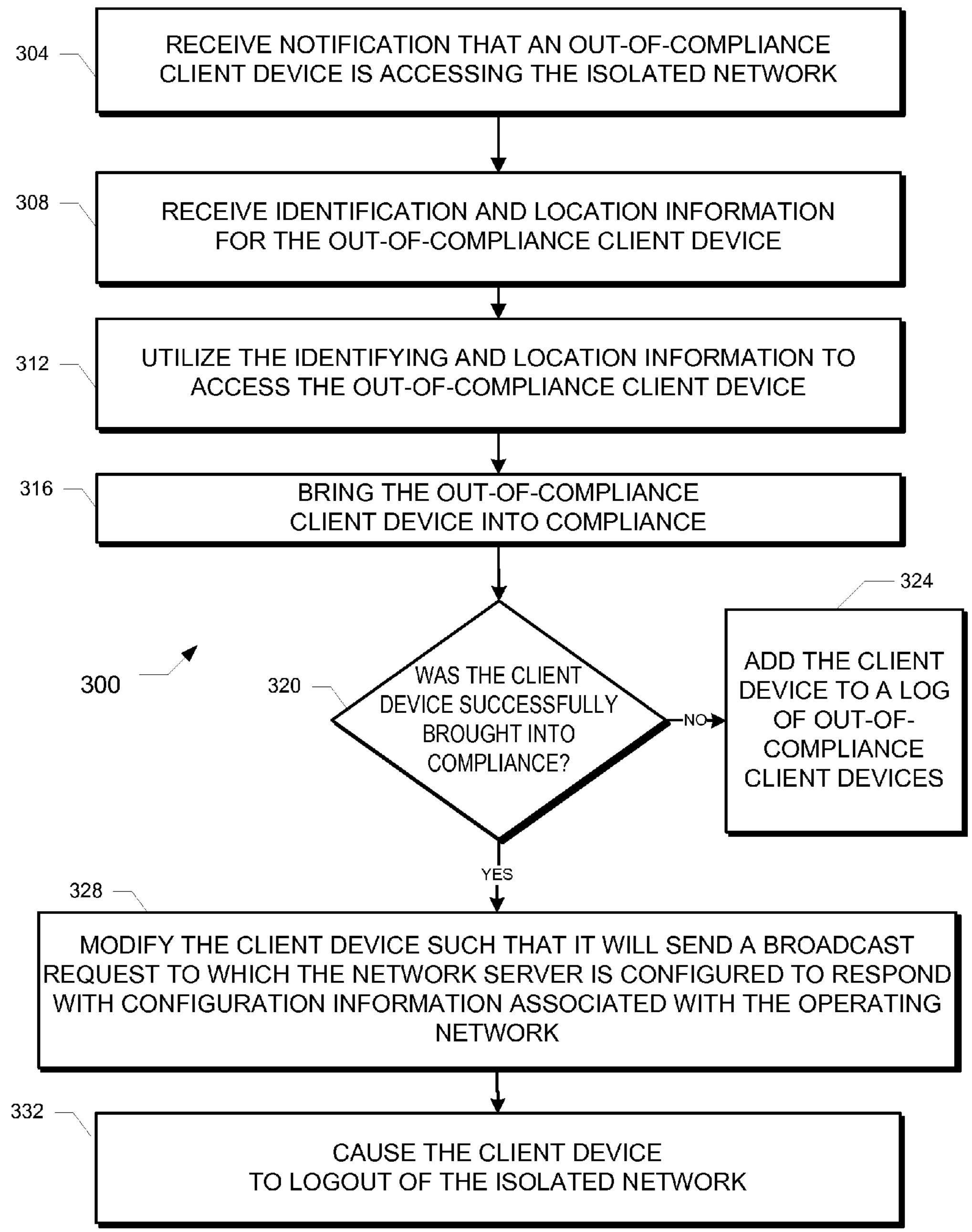
FIG. 3 provides a flow diagram illustrating an exemplary compliance process 300 for implementation in the exemplary environment of FIGS. 1*a* and 1*b*, in accordance with an embodiment of the present invention.

FIG. 3 provides a flow diagram illustrating an exemplary compliance process 300 for implementation in the exemplary environment 100 of FIGS. 1*a* and 1*b*, in accordance with an embodiment of the present invention. According to the illustrated embodiment, the compliance process 300 attempts to bring the quarantined out of compliance client device 108*a* into compliance, and, if the client device 108*a* is indeed brought into compliance, the process 300 modifies the client device 108*a* such that it can reconnect to the operating network 104.

As illustrated in FIG. 3, the exemplary process 300, as represented at block 304, generally begins with receiving notification that the out of compliance client device 108*a* has been routed to and is now accessing the isolated network 124. Once on the isolated network 124, the client device 108*a* cannot access the Internet or any of the client devices 108*a* on the operating network 104. According to an embodiment, if the client device 108*a* attempts to access the Internet, a webpage or other interface is returned that indicates that the client device 108*a* is out of compliance and that provides a link that launches the compliance tool 128. Next, as represented by block 308, the exemplary process 300 includes receiving identification information and location information for the client device 108*a* on the isolated network 124. Then, as represented by block 312, the identification information and the location information are utilized to access the client device 108*a* on the isolated network 124. According to the illustrated embodiment, the identification information and the location information are provided to the compliance tool 128, which is configured to utilize that information to locate and access the client device 108*a* on the isolated network 124.

Next, as represented by block 316, the exemplary process 300 involves attempting to bring the client device 108*a* into compliance. According to the illustrated embodiment, the compliance tool 120 attempts to bring the client device 108*a* into compliance, according to the step represented by block 316. Then, as indicated by decision block 320, the process 300 involves determining whether the client device 108*a* was successfully brought into compliance. If the client device 108*a* was not brought into compliance, then, as represented by block 324, the process 300 involves adding identification information about the client device 108*a* to a log of out-of-compliant devices. According to the illustrated embodiment, the compliance tool 120, upon not being able to bring the client device 108*a* into compliance, accesses the out of compliance client device database 132 and adds identification information about the client device 108*a* to a log of out-of-compliant devices.

However, if the client device 108*a* was successfully brought into compliance, then, as represented by block 328, the exemplary process 300 involves modifying the client device 108*a* such that the client device 108*a* is configured to transmit a broadcast request that will cause the network server 112 to respond with configuration information associated with the operating network 104. According to the illustrated embodiment, the compliance tool 128 modifies the client device 108*a* according to the step represented by block 328. In particular, according to the illustrated embodiment, the compliance tool 128, after accessing the client device 108*a* pursuant to the step represented by block 312, modifies the client device 108*a* such that the client device 108*a* is configured to transmit a broadcast request associated with configuration information in the configuration information database 116 that corresponds to the operating network 104. After modifying the client device 108*a*, the process 300, as indicated at block 332, involves causing the client device 108*a* to log out of the isolated network 124. According to an embodiment, to cause the client device 108*a* to log out of the isolated network 124, the compliance tool 128 is configured to restart the network interface of the client device 108*a*. When the client device 108*a* restarts and attempts to reconnect to the isolated network 124, it transmits the modified broadcast request to the network server 112, which then searches the configuration information database 116 and identifies configuration information that matches the modified broadcast request. The network server 112 then replies to client device 108*a* with the configuration information that matches the modified broadcast request. In this case, the configuration information that matches the modified broadcast request is associated with the operating network 104, not the isolated network 124. Accordingly, the client device connects to the operating network 104, as illustrated in FIG. 1*a*.

Figure 4:
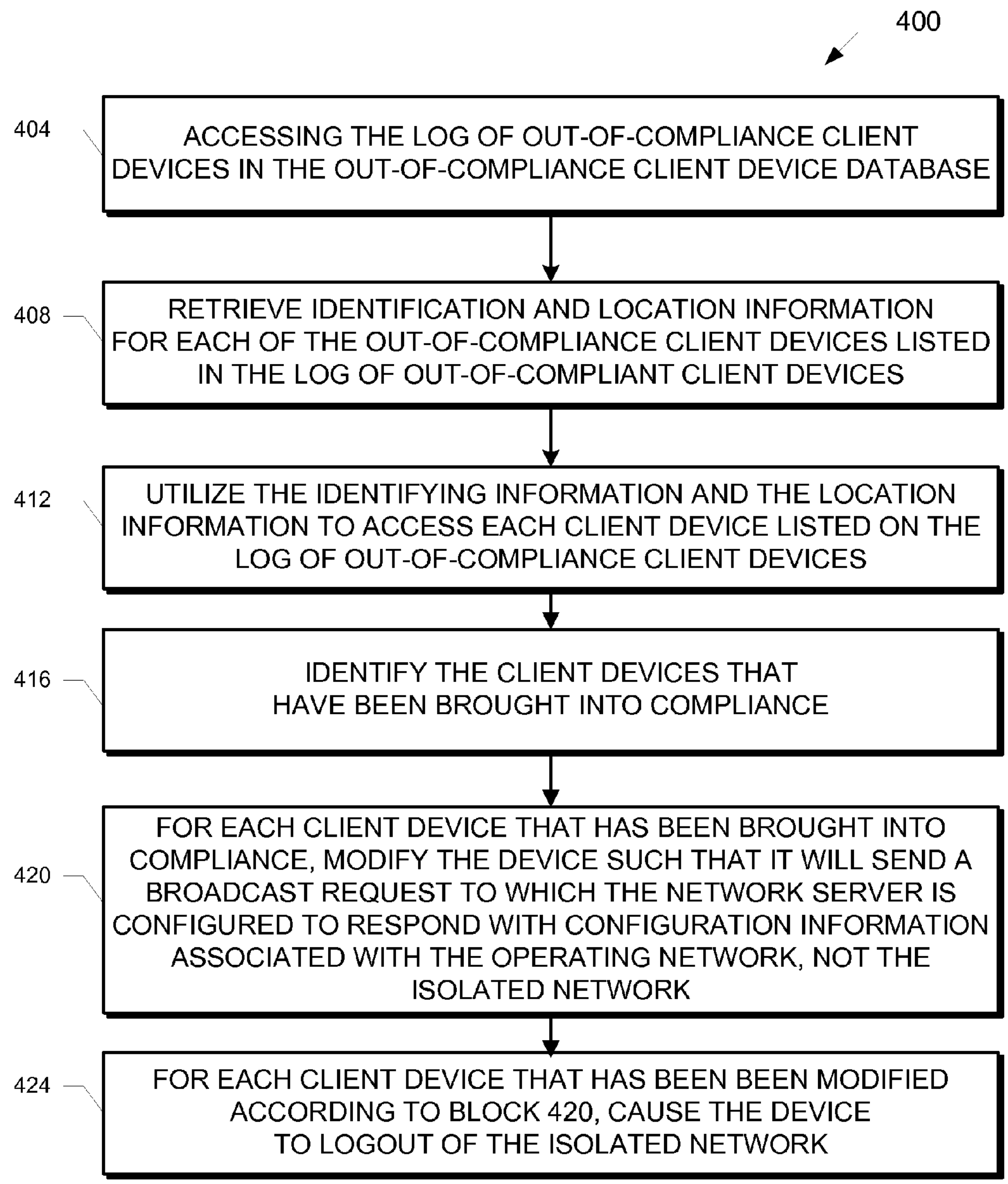
FIG. 4 provides a flow diagram illustrating an exemplary compliance-status-determination process for implementation in the exemplary environment of FIGS. 1*a* and 1*b*, in accordance with an embodiment of the present invention.

FIG. 4 provides a flow diagram illustrating an exemplary compliance-status-determination process 400 for implementation in the exemplary environment 100 of FIGS. 1*a* and 1*b*, in accordance with an embodiment of the present invention. According to the illustrated embodiment, the compliance-status-determination process 400 periodically accesses the client devices 108 that are listed in the log of out of compliance client devices, which is stored in the out of compliance client device database 132, and determines whether the client devices 108 have been brought into compliance. If one of the client devices 108 is indeed brought into compliance, the process 400 modifies the client device such that it can reconnect to the operating network 104.

As illustrated in FIG. 4, the exemplary process 400, as represented at block 404, generally begins with accessing the log of out of compliance client devices in the out of compliance client device database 132 and, as represented at block 408, obtaining from the log of out of compliance client devices the identification and location information for each of the client devices 108 listed in the log. As represented at block 412, the process 400 further involves accessing each of the listed client devices 108 and then, as represented by block 416, determining whether the client device 108 has been brought into compliance. According to an embodiment, the compliance tool 128 executes the steps represented by blocks 404, 408, 412, and 416. To do so, the compliance tool 128 accesses the out of compliance client device database 132 and obtains from the log of out of compliance client devices the identification and location information for each client device 208 listed in the log. The compliance tool 128 then utilizes that information to access each client device 208 on the isolated network 124 and identifies the client devices 208 that have been brought into compliance.

For each of the client devices 108 that have been brought into compliance, the exemplary process 400, as represented by block 420, involves modifying the client device 108 such that the client device 108 transmits a broadcast request that causes the network server 112 to respond with configuration information associated with the operating network 104. According to the illustrated embodiment, the compliance tool 128 is configured to modify each of client devices 108 that were identified as being brought into compliance according to the step represented by block 420. In particular, according to the illustrated embodiment, the compliance tool 128, for each of the client devices 108, after accessing the client device 108 and determining that the client device 108 has been brought into compliance, pursuant to the steps represented by blocks 412 and 416, modifies the client device 108 such that the client device 108 is configured to transmit a broadcast request associated with configuration information in the configuration information database 116 that corresponds to the operating network 104. Further for each of the client devices 108 that were identified as being brought into compliance, the process 400, as indicated at block 424, involves causing the client device 108 to log out of the isolated network 124. According to an embodiment, to cause each of the client devices 108 to log out of the isolated network 124, the compliance tool 128 is configured to restart the network interface of the each of client devices 108.

Figure 5A:
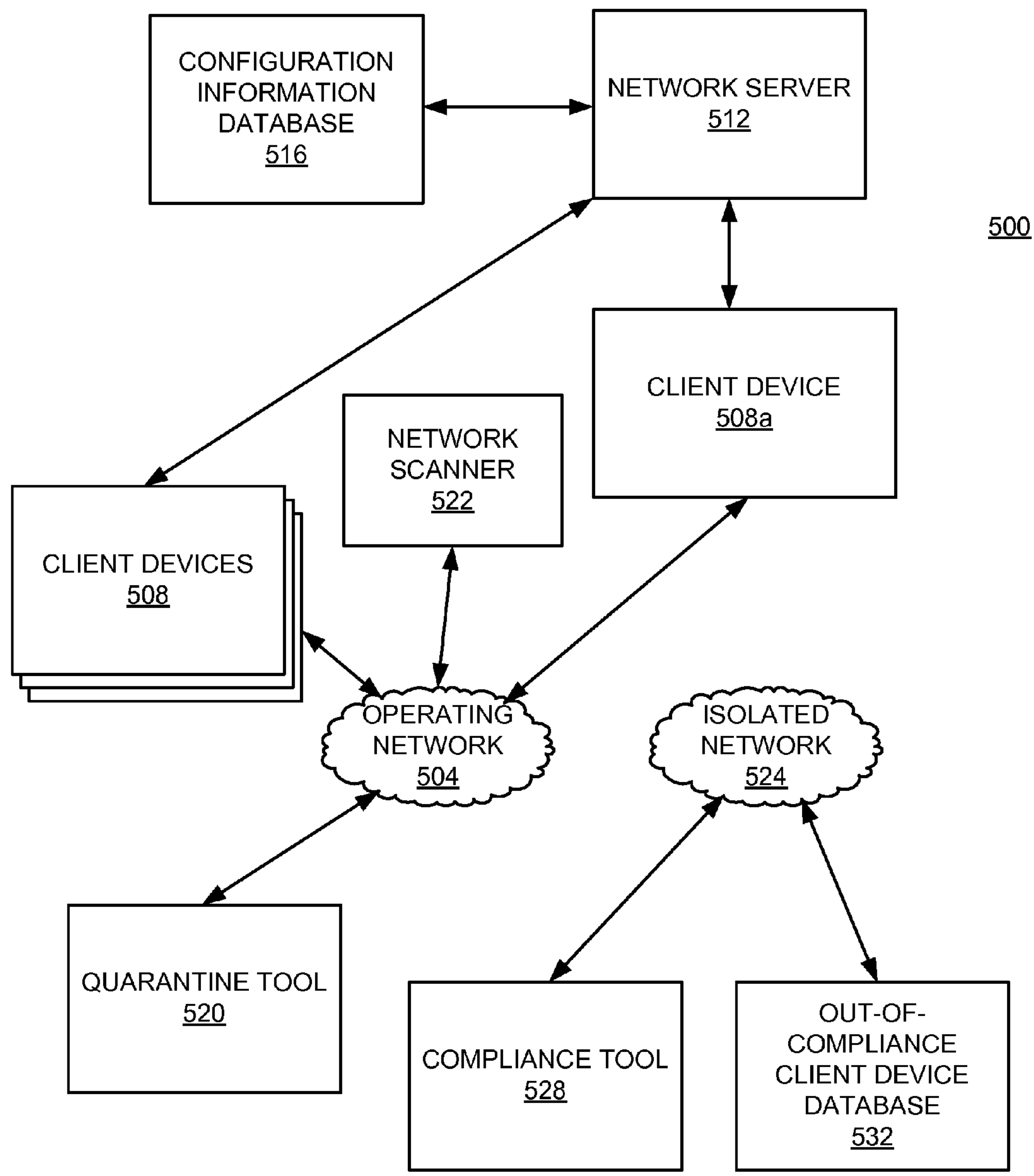
FIG. 5*a* provides a block diagram illustrating another exemplary environment in which exemplary processes described herein are implemented for identifying, quarantining, and restoring out of compliance client devices, in accordance with an embodiment of the invention.
Figure 5B:
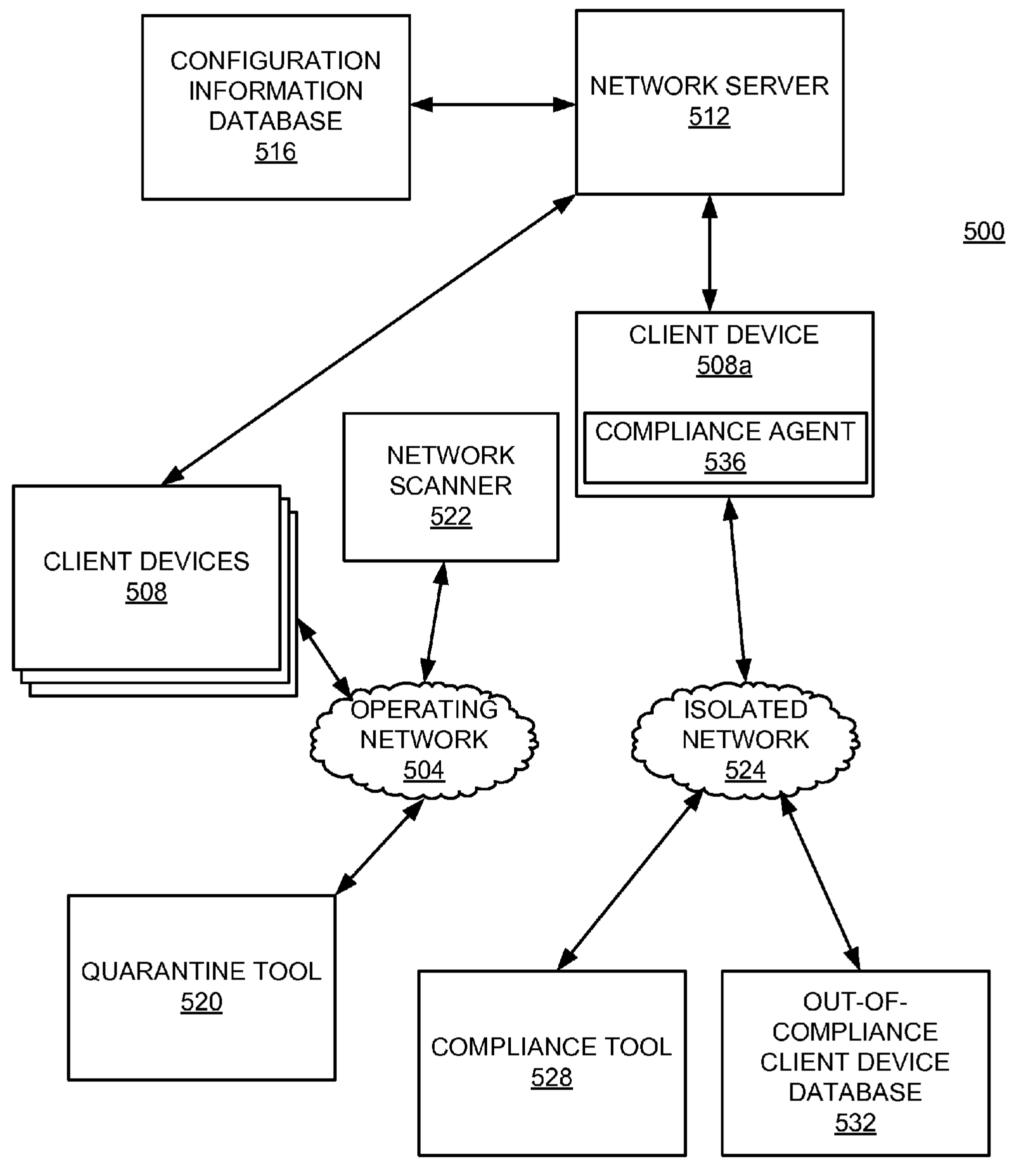
FIG. 5*b* provides a block diagram illustrating the exemplary environment of FIG. 5*a*, where an out of compliance client device is connected to an isolated network and quarantined from other client devices, in accordance with an embodiment of the invention.

FIGS. 5*a* and 5*b* provide block diagrams illustrating an environment 500 in which the processes described herein for quarantining an out of compliance client device and bringing the out of compliance client device into compliance are implemented, in accordance with an embodiment of the invention. It should be appreciated that, according to some embodiments, environments 100 and 500 have the same features and that process 200, 300 and 400, which are described as above as being implemented in environment 100, could be implemented in environment 500. Likewise, processes 600, 700, and 800, which are described as below as being implemented in environment 500, could be implemented in environment 100.

As illustrated in FIGS. 5*a* and 5*b*, the environment 500 includes an operating network 504 that interconnects a plurality of client devices 508, a quarantine tool 520, and a network scanner 522. Further, an exemplary client device 508*a* selected from among the plurality of client devices 508 is provided in communication with a network server 512, which is in communication with a configuration information database 516. As described in more detail below with reference to FIG. 8, the network scanner 522 "crawls" the operating network 504 and identifies client devices 508 that are out of compliance. According to the illustrated embodiment, the environment 500 further includes an isolated network 524 that interconnects a compliance tool 528 and an out of compliance client device database 532. In FIG. 5*a*, the client device 508*a* is connected to the operating network 504, which puts the client device 508*a* in communication with the other client devices 508 and the quarantine tool 520. However, in FIG. 5*b*, the client device 508*a* is connected the isolated network 524, not the operating network 504. Accordingly, in FIG. 5*b*, the client device 508*a* is quarantined from the operating network 504 and unable to communicate with the other client devices 508 on the operating network 504.

Although, for simplicity, FIGS. 5*a* and 5*b* only illustrate one of each device, it will be appreciated that, in an embodiment of the invention, there may be two or more of the client devices 508*a*, network servers 512, quarantine tools 520, compliance tools 528, and/or databases 516, 532. Also, although the quarantine tool 520 and the compliance tool 528 are illustrated as separate tools, as described in more detail below, it should be appreciated that the quarantine tool 520 and the compliance tool 528 can be combined into a single tool.

Figure 6:
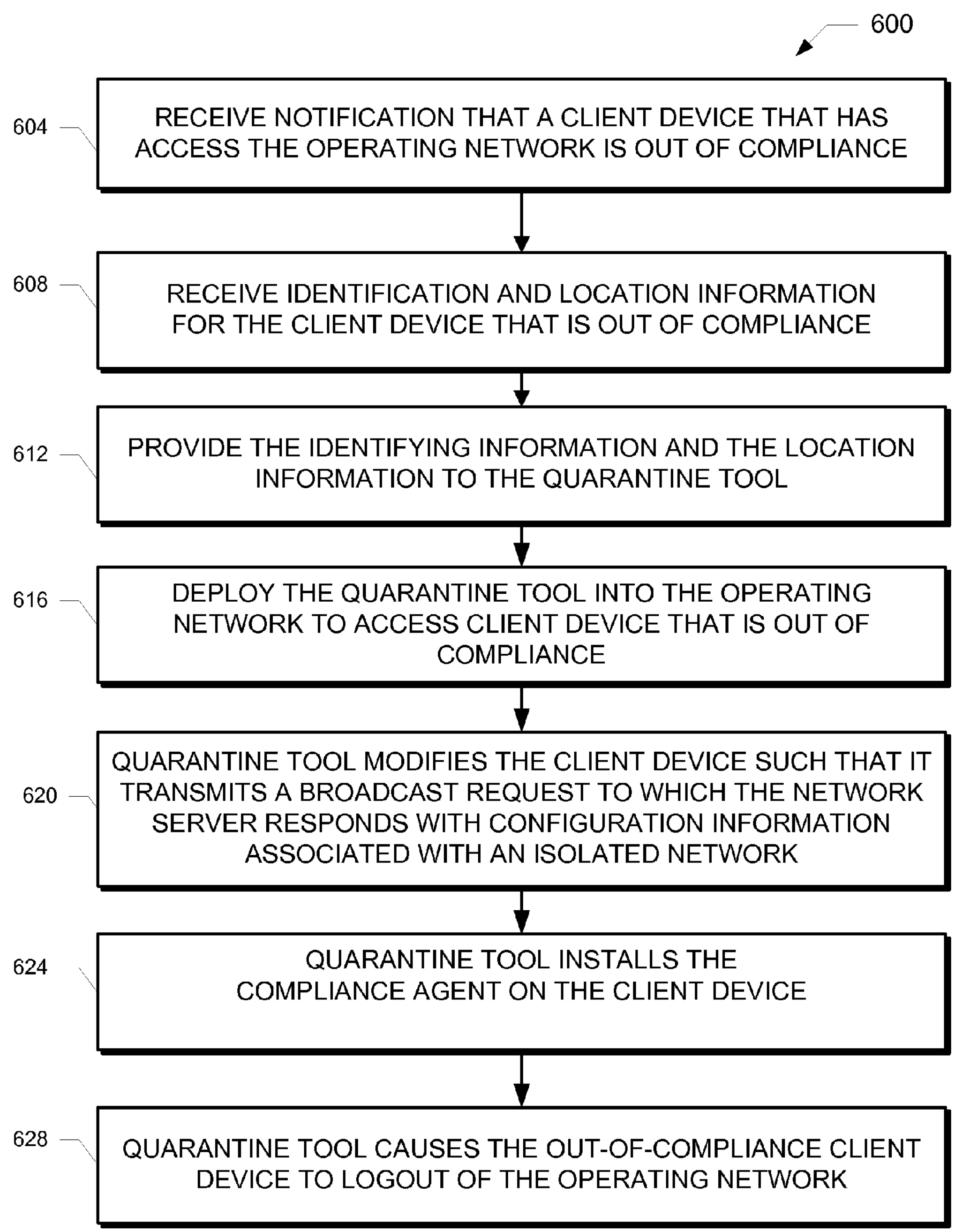
FIG. 6 provides a flow diagram illustrating an exemplary quarantining and compliance process for implementation in the environment of FIGS. 5*a* and 5*b*, where the exemplary quarantining process involves installing a compliance agent on client devices that are out of compliance, in accordance with an embodiment of the present invention.

FIG. 6 provides a flow diagram illustrating an exemplary quarantining and compliance process 600 for implementation in the environment 500 of FIGS. 5*a* and 5*b*, where the exemplary quarantining and compliance process 600 involves installing a compliance agent 536 on client devices 508 that are out of compliance, in accordance with an embodiment of the present invention.

As illustrated in FIG. 6, the exemplary process 600, as represented at block 604, generally begins with receiving notification that the client device 108*a* is out of compliance. Next, as represented by block 608, the exemplary process 600 includes receiving identification information and location information for the client device 508*a*, which, as illustrated in FIG. 5*a*, is on the operating network 504. Then, as represented by block 612, identification information and the location information are provided to the quarantine tool 520, which, as indicated by block 616, is then deployed into the operating network 504 to access the client device 508*a*.

Next, as represented by block 620, the quarantine tool 520 modifies the client device 508*a*, which has been identified as being out of compliance, such that the client device 508*a* is configured to transmit a broadcast request that will cause the network server 512 to respond with configuration information associated with the isolated network 524. The quarantine tool 520 also installs the compliance agent 536 on the client device 508*a*, as represented by block 624 and as illustrated in FIG. 5*b*. As represented by block 628, the quarantine tool 520 also causes the client device 508*a* to log off of the operating network 104.

According to an embodiment, to cause the client device 508*a* to log out of the operating network 504, the quarantine tool 520 restarts the network interface of the client device 508*a*. Accordingly, when the network interface restarts, it transmits the modified broadcast request to the network server 512, which then searches the configuration information database 516 and identifies configuration information that is associated with the modified broadcast request. The network server 512 then replies to client device 508*a* with the configuration information that matches the modified broadcast request. However, according to the illustrated embodiment, the configuration information that matches the modified broadcast request is associated with the isolated network 524, not the operating network 504. Accordingly, the client device 508*a* connects to the isolated network 524, as illustrated in FIG. 5*b*. According to the illustrated embodiment, the configuration information that the network server 512 provides to the client device 508*a*, after the client device has been modified because it was identified as being out of compliance, will not permit the client device 508*a* to log into the operating network 504.

Figure 7:
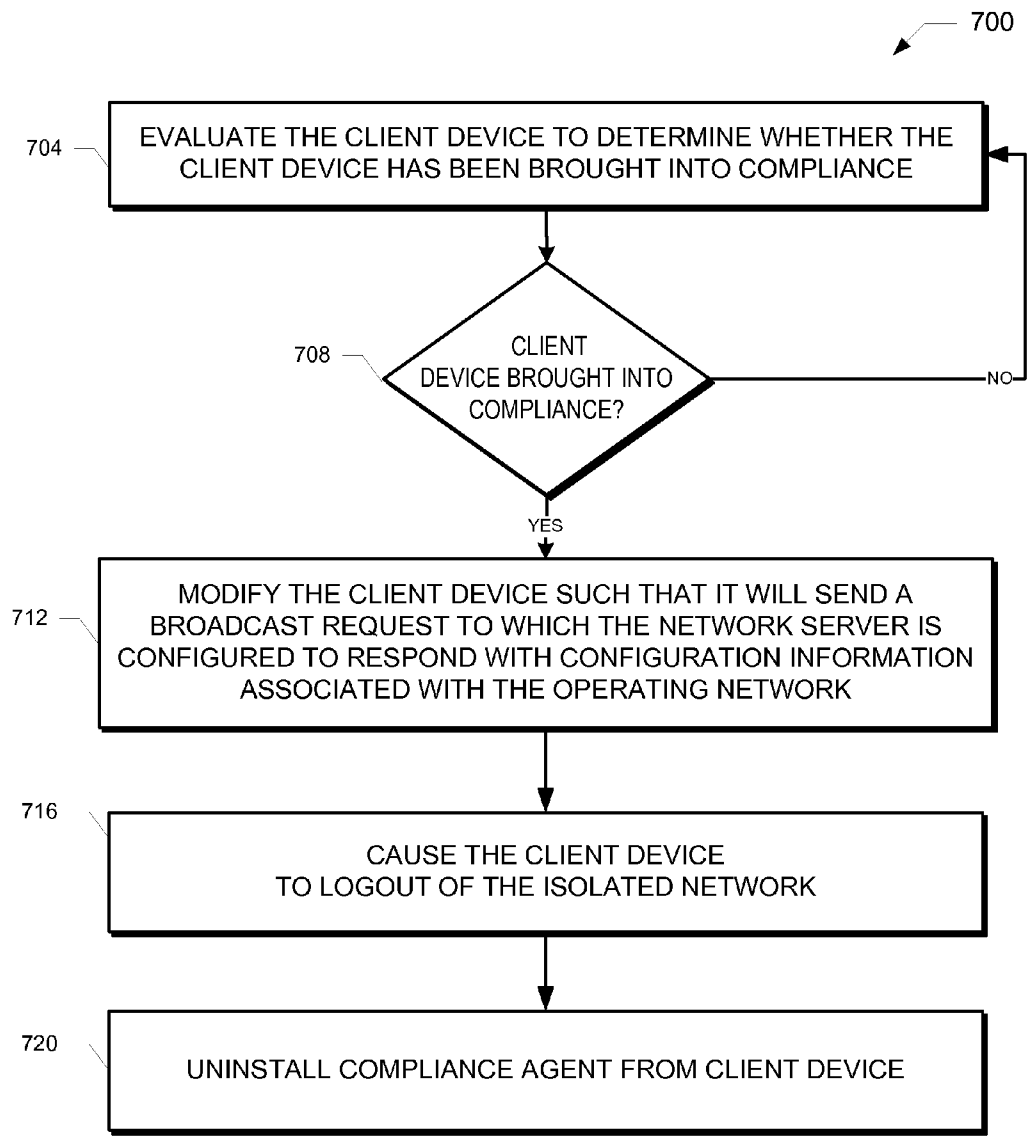
FIG. 7 provides a flow diagram illustrating an exemplary compliance process of a compliance agent installed on a client device, in accordance with an embodiment of the present invention.

FIG. 7 provides a flow diagram illustrating an exemplary compliance process 700 of the compliance agent 536 installed on the out of compliance client device 508*a*, in accordance with an embodiment of the present invention. As indicated at block 704, the compliance process 700 generally begins with the compliance agent 536 periodically evaluating the client device 508*a* to determine if the client device 508*a* has been brought into compliance. As indicated at decision block 708, if the client device 508*a* has not been brought into compliance, then the compliance agent 536 continues to periodically evaluate the client device 508*a*. However, as indicated at decision block 708, if the compliance agent 536 determines that the client device 508*a* has been brought into compliance, then, as indicated by block 712, the compliance agent 536 modifies the client device 508*a* such that the client device 508*a* is configured to transmit a broadcast request that will cause the network server 512 to respond with configuration information associated with the operating network 504. After modifying the client device 508*a*, the compliance agent 536, as indicated at block 716, causes the client device 508*a* to log out of the isolated network 524. According to an embodiment, to cause the client device 508*a* to log out of the isolated network 524, the compliance agent 536 restarts the network interface of the client device 108*a*. Accordingly, when the network interface restarts, it transmits the modified broadcast request that is associated with configuration information associated with the operating network 504. Accordingly, the client device 508*a* connects to the network 524 when the network interface restarts. Further, according to the illustrated embodiment, the process 700, as represented at block 720, involves removing the compliance agent 536 from the client device 536.

Figure 8:
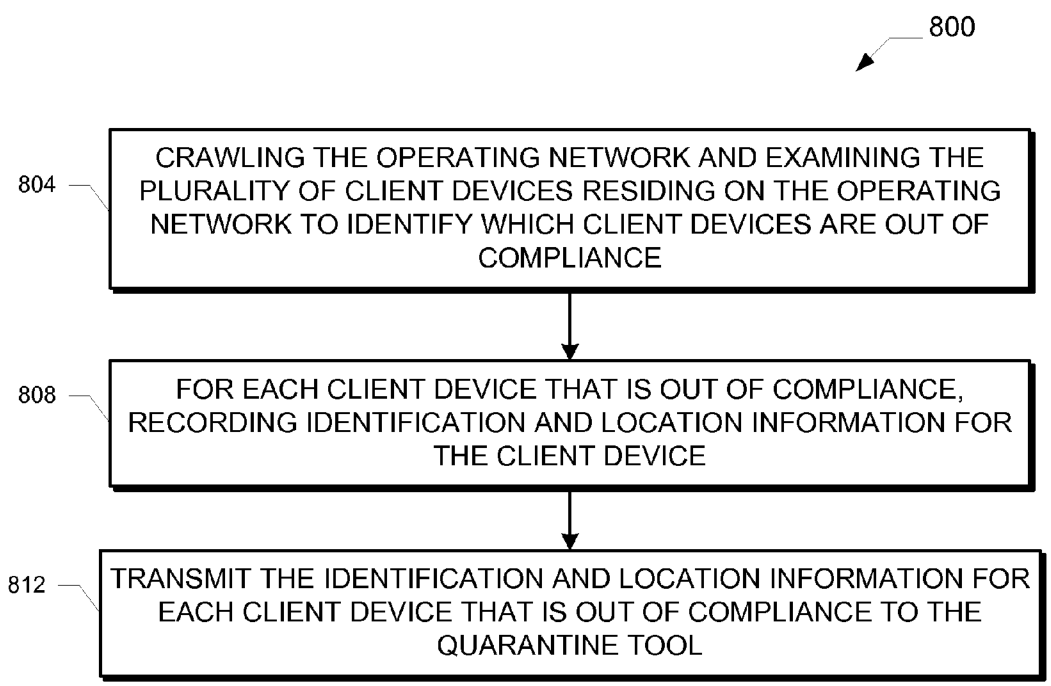
FIG. 8 provides a flow diagram illustrating an exemplary process of identifying client devices on the operating network that are out of compliance, in accordance with an embodiment of the invention.

FIG. 8 provides a flow diagram illustrating an exemplary process 800 of identifying client devices 508 on the operating network 504 that are out of compliance, in accordance with an embodiment of the invention. In accordance with some embodiments of the invention, the process 800, as represented at block 804, generally begins with deploying the network scanner 522 to "crawl" (i.e., systematically scan devices on a network) the operating network 504 and examine the plurality of client devices 508 residing on the operating network 504 to identify which client devices 508 are out of compliance. As indicated at block 808, for each client device 508 that is found to be out of compliance, the network scanner 522 records identification and location information about the client device 508. For example, the identification information could be, but is not limited to: the media access control (MAC) address of the network interface card (NIC) of the client device 508; the serial number of the NIC or of the client device 508 itself; or the IP address assigned to the client device 508 at the time it was identified as being out of compliance. Also, for example, the location information may include, but is not limited to, the path of the client device 508 on the operating network 504. After the network scanner 522 records identification and location information about the client devices 508 that are identified as being out of compliance, the network scanner 522, as represented by block 812, transmits the identification and location information to the quarantine tool 520 so that the quarantine tool 520 can quarantine the out of compliance client devices from the other client devices on the operating network 504.

The network scanner 522 may be instructed to crawl the operating network 504 on demand and/or the network scanner 522 may be scheduled to run at a predetermined time or at predetermined intervals. For example, the network scanner 522 may be a Windows service that is scheduled to execute through use of Windows Scheduled Task. With regard to the scope of the reach of the network scanner 522, according to one embodiment, the operating network 504 is the private network of a company or organization and the plurality of client devices 508 comprises all of the user client devices 408 residing on the company's private network. According to other embodiments, the plurality of user client devices 508 is a designated subset of all clients residing on the operating network 504. The rules determining which clients are included in the subset may be defined by a network administrator and communicated to the network scanner 522 so that it will only examine client devices 508 that meet the rule requirements. For example, the administrator may determine that only certain client devices 508 associated with a particular division within an organization or only a particular type of client device, such as a user computer, should be targeted by network scanner 522. In some embodiments, the network scanner 522 may be configured to identify the client devices 508 that should be examined after it has begun crawling the operating network 504.

FIGS. 9*a* and 9*b* provide block diagrams illustrating an environment 900 in which the processes described herein for quarantining an out of compliance client device are implemented, in accordance with an embodiment of the invention. The environment 900 is one example of the environments illustrated in FIGS. 1*a*, 1*b* and/or 5*a*, 5*b*. The environment 900 generally includes a plurality of client devices 908 in communication with a quarantine server 912 over an operating network 904. The quarantine server 912 comprises a user-interface apparatus 916, a network-interface apparatus 920, and a memory apparatus 924 operatively coupled to a processing apparatus 928.

As used herein, the term "apparatus" refers to a device or a combination of devices having the hardware and, in some cases, software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art that in view of this disclosure, although FIGS. 9*a* and 9*b* illustrate the user interface 916, network interface 920, memory apparatus 924, and processing apparatus 928 as separate blocks in the block diagram, these separations may be merely conceptual. In other words, in some instances, the user interface 916, for example, is a separate and distinct device from the processing apparatus 928 and the memory apparatus 924 and therefore may have its own processor, memory, and software. In other instances, however, the user interface 916 is directly coupled to or integral with at least one part of the processing apparatus 928 and at least one part of the memory apparatus 924 and includes the user interface input and output hardware used by the processing apparatus 928 when the processing apparatus 928 executes user input and output software stored in the memory apparatus 924.

As will be described in greater detail below, in one embodiment, the quarantine server 912 is entirely contained within a user terminal, such as a personal computer or mobile terminal, while, in other embodiments, the quarantine server 912 includes a central computing system, one or more network servers, and one or more user terminals in communication with the central computing system via a network and the one or more network servers. FIGS. 9*a* and 9*b* are intended to cover both types of configurations as well as other configurations that will be apparent to one of ordinary skill in the art in view of this disclosure.

The user interface 916 includes hardware and/or software for receiving input into the quarantine server 912 from a user and hardware and/or software for communicating output from the quarantine server 912 to a user. In some embodiments, the user interface 916 includes one or more user input devices, such as a keyboard, keypad, mouse, microphone, touch screen, touch pad, controller, and/or the like. In some embodiments, the user interface 916 includes one or more user output devices, such as a display (e.g., a monitor, liquid crystal display, one or more light emitting diodes, etc.), a speaker, a tactile output device, a printer, and/or other sensory devices that can be used to communicate information to a user.

In some embodiments, the network interface 920 is configured to receive electronic input from other devices in the operating network 904, including the client devices 908. In some embodiments, the network interface 920 is further configured to send electronic output to other devices in a network. The operating network 904 may include a direct connection between a plurality of devices, a global area network such as the Internet, a wide area network such as an intranet, a local area network, a wireline network, a wireless network, a virtual private network, other types of networks, and/or a combination of the foregoing.

The processing apparatus 928 includes circuitry used for implementing communication and logic functions of the quarantine server 912. For example, the processing apparatus 928 may include a digital signal processor device, a microprocessor device, and various analog-to-digital converters, digital-to-analog converters, and other support circuits. Control and signal processing functions of the quarantine server 912 are allocated between these devices according to their respective capabilities. The processing apparatus 928 may include functionality to operate one or more software programs based on computer-readable instructions thereof, which may be stored in the memory apparatus 924.

As described in greater detail below, in one embodiment of the invention, the memory apparatus 924 includes a network scanner application 982, a quarantine tool application 984, and a data-sourcing application 986 stored therein for instructing the processing apparatus 928 to perform one or more operations of the procedures described herein and in reference to FIGS. 10*a-c*. Some embodiments of the invention may include other computer programs stored in the memory apparatus 924.

In general, the memory apparatus 924 is communicatively coupled to the processing apparatus 928 and includes computer-readable medium for storing computer-readable program code and instructions, as well as datastores containing data and/or databases. More particularly, the memory apparatus 928 may include volatile memory, such as volatile Random Access Memory (RAM) including a cache area for the temporary storage of data. The memory apparatus 924 may also include non-volatile memory that can be embedded and/or may be removable. The non-volatile memory can, for example, comprise an EEPROM, flash memory, or the like. The memory apparatus 924 can store any of a number of pieces of information and data used by the quarantine server 912 to implement the functions of the quarantine server 912 described herein.

In the illustrated embodiment, the memory apparatus 924 includes datastores containing client device data 988. According to some embodiments, for each client device 908 on the operating network 904, the client device data 988 includes, for example, identification/location information, such as the MAC address, IP address, serial number, etc. and user information about the user assigned to the client device. In some embodiments, the client device data 988 may be received from a user via the user interface 916, or may be obtained through electronic communication with another device via the operating network 904 and utilizing the network interface 916, and then stored in the memory apparatus 924.

The environment 904 also includes an isolation server 932 connected to an isolated network 936. The isolation server 932 comprises a user-interface apparatus 938, a network-interface apparatus 940, and a memory apparatus 944 operatively coupled to a processing apparatus 948.

It will be understood by one of ordinary skill in the art that, although FIGS. 9*a* and 9*b* illustrate the user interface 938, network interface 940, memory apparatus 944, and processing apparatus 948 as separate blocks in the block diagram, these separations may be merely conceptual. In other words, in some instances, the user interface 938, for example, is a separate and distinct device from the processing apparatus 948 and the memory apparatus 944 and therefore may have its own processor, memory, and software. In other instances, however, the user interface 938 is directly coupled to or integral with at least one part of the processing apparatus 948 and at least one part of the memory apparatus 944 and includes the user interface input and output hardware used by the processing apparatus 948 when the processing apparatus 948 executes user input and output software stored in the memory apparatus 944.

As will be described in greater detail below, in one embodiment, the isolation server 932 is entirely contained within a user terminal, such as a personal computer or mobile terminal, while, in other embodiments, the isolation server 932 includes a central computing system, one or more network servers, and one or more user terminals in communication with the central computing system via a network and the one or more network servers. FIGS. 9*a* and 9*b* are intended to cover both types of configurations as well as other configurations that will be apparent to one of ordinary skill in the art in view of this disclosure.

The user interface 938 includes hardware and/or software for receiving input into the isolation server 932 from a user and hardware and/or software for communicating output from the isolation server 932 to a user. In some embodiments, the user interface 938 includes one or more user input devices, such as a keyboard, keypad, mouse, microphone, touch screen, touch pad, controller, and/or the like. In some embodiments, the user interface 938 includes one or more user output devices, such as a display (e.g., a monitor, liquid crystal display, one or more light emitting diodes, etc.), a speaker, a tactile output device, a printer, and/or other sensory devices that can be used to communicate information to a user.

In some embodiments, the network interface 940 is configured to receive electronic input from other devices in the isolated network 936. In some embodiments, the network interface 940 is further configured to send electronic output to other devices in a network. The isolated network 936 may include a direct connection between a plurality of devices, a global area network such as the Internet, a wide area network such as an intranet, a local area network, a wireline network, a wireless network, a virtual private network, other types of networks, and/or a combination of the foregoing.

The processing apparatus 948 includes circuitry used for implementing communication and logic functions of the isolation server 932. For example, the processing apparatus 948 may include a digital signal processor device, a microprocessor device, and various analog-to-digital converters, digital-to-analog converters, and other support circuits. Control and signal processing functions of the isolation server 932 are allocated between these devices according to their respective capabilities. The processing apparatus 948 may include functionality to operate one or more software programs based on computer-readable instructions thereof, which may be stored in the memory apparatus 944.

As described in greater detail below, in one embodiment of the invention, the memory apparatus 944 includes a compliance agent application 990, a web server application 991, and a data-sourcing application 992 stored therein for instructing the processing apparatus 948 to perform one or more operations of the procedures described herein and in reference to FIGS. 10*a-c*. Some embodiments of the invention may include other computer programs stored in the memory apparatus 944.

In general, the memory apparatus 944 is communicatively coupled to the processing apparatus 948 and includes computer-readable medium for storing computer-readable program code and instructions, as well as datastores containing data and/or databases. More particularly, the memory apparatus 948 may include volatile memory, such as volatile Random Access Memory (RAM) including a cache area for the temporary storage of data. The memory apparatus 944 may also include non-volatile memory that can be embedded and/or may be removable. The non-volatile memory can, for example, comprise an EEPROM, flash memory, or the like. The memory apparatus 944 can store any of a number of pieces of information and data used by the isolation server 932 to implement the functions of the isolation server 932 described herein.

In the illustrated embodiment, the memory apparatus 944 includes datastores containing out of compliance client device data 994. According to some embodiments, for each out of compliance client device 908 on the isolated network 936, the out of compliance client device data 994 includes, for example, identification/location information, such as the MAC address, IP address, serial number, etc and user information about the user assigned to the client device. In some embodiments, the out of compliance client device data 994 may be received from a user via the user interface 938, or may be obtained through electronic communication with another device via the isolated network 936 and utilizing the network interface 940, and then stored in the memory apparatus 944.

The environment 900 further includes an exemplary client device 908*a* selected from among the plurality of client devices 908 and connected to a Dynamic Host Configuration Protocol (DHCP) server 952. The DHCP server 952 comprises a user-interface apparatus 960, a network-interface apparatus 964, and a memory apparatus 968 operatively coupled to a processing apparatus 972. The compliance device 908*a* includes a network interface card (NIC) 976, which assigns the client device 908*a* a unique media access control MAC address 980. The NIC 976 provides the client device 908*a* with an interface to either the operating network 904 or the isolated network 924 and allows the client device 908*a* to access either the operating network 904 or the isolated network 924.

In FIG. 9*a*, the NIC 976 is configured to give the client device 908*a* access to the operating network 904. Accordingly, in FIG. 9*a* is in communication with the other client devices 908 and the quarantine server 912. However, in FIG. 9*b*, the NIC 976 is configured to give the client device 908*a* access to the isolated network 936, not the operating network 904. Accordingly, in FIG. 9*b*, the client device 908*a* is quarantined from the operating network 904 and unable to communicate with the other client devices 908 on the operating network 904.

It will be understood by one of ordinary skill in the art that, although FIGS. 9*a* and 9*b* illustrate the user interface 960, network interface 964, memory apparatus 968, and processing apparatus 972 as separate blocks in the block diagram, these separations may be merely conceptual. In other words, in some instances, the user interface 960, for example, is a separate and distinct device from the processing apparatus 972 and the memory apparatus 968 and therefore may have its own processor, memory, and software. In other instances, however, the user interface 960 is directly coupled to or integral with at least one part of the processing apparatus 972 and at least one part of the memory apparatus 968 and includes the user interface input and output hardware used by the processing apparatus 972 when the processing apparatus 972 executes user input and output software stored in the memory apparatus 968.

The user interface 960 includes hardware and/or software for receiving input from a user and hardware and/or software for communicating output to a user. In some embodiments, the user interface 960 includes one or more user input devices, such as a keyboard, keypad, mouse, microphone, touch screen, touch pad, controller, and/or the like. In some embodiments, the user interface 960 includes one or more user output devices, such as a display (e.g., a monitor, liquid crystal display, one or more light emitting diodes, etc.), a speaker, a tactile output device, a printer, and/or other sensory devices that can be used to communicate information to a user.

In some embodiments, the network interface 964 is configured to receive electronic input from the NIC 976 of client device 908*a* and the plurality of client devices 908. In some embodiments, the network interface 964 is further configured to send electronic output to the NIC 976 of client device 908*a* and the plurality of client devices 908. According to some embodiments, the DHCP server 952 and the client device 908*a* and the client devices 908 communication via a direct connection, a global area network such as the Internet, a wide area network such as an intranet, a local area network, a wireline network, a wireless network, a virtual private network, other types of networks, and/or a combination of the foregoing.

The processing apparatus 972 includes circuitry used for implementing communication and logic functions. For example, the processing apparatus 972 may include a digital signal processor device, a microprocessor device, and various analog-to-digital converters, digital-to-analog converters, and other support circuits. Control and signal processing functions are allocated between these devices according to their respective capabilities. The processing apparatus 972 may include functionality to operate one or more software programs based on computer-readable instructions thereof, which may be stored in the memory apparatus 968.

As described in greater detail below, in one embodiment of the invention, the memory apparatus 968 includes a DHCP application 996 and a data-sourcing application 997 stored therein for instructing the processing apparatus 972 to perform one or more operations of the procedures described herein and in reference to FIGS. 10*a-c*. Some embodiments of the invention may include other computer programs stored in the memory apparatus 968.

In general, the memory apparatus 968 is communicatively coupled to the processing apparatus 972 and includes computer-readable medium for storing computer-readable program code and instructions, as well as datastores containing data and/or databases. More particularly, the memory apparatus 968 may include volatile memory, such as volatile Random Access Memory (RAM) including a cache area for the temporary storage of data. The memory apparatus 968 may also include non-volatile memory that can be embedded and/or may be removable. The non-volatile memory can, for example, comprise an EEPROM, flash memory, or the like. The memory apparatus 968 can store any of a number of pieces of information and data used by the client devices 908 and the client device 908*a* to implement the functions of the DHCP server 952 described herein.

In the illustrated embodiment, the memory apparatus 968 includes datastores containing network configuration data 998. According to some embodiments, the network configuration data 998 contains IP address assignments and other configuration information necessary for the client devices 908 to connect to either the operating network 904 or the isolated network 936. In some embodiments, the network configuration data 998 may be received from a user via the user interface 960, or may be obtained through electronic communication with another device via the network interface 964, and then stored in the memory apparatus 968.

For the sake of clarity and ease of description, the figures provided herein generally illustrate the client device data 988 and the out of compliance client device data 994 as each being separate from one another. However, it will be understood that, in some embodiments, these datastores may be combined or the data described as being stored within such datastores may be further separated into additional datastores. For example, in some embodiments, client device data 988 includes the out of compliance client device data 994.

In one embodiment, data within each of the datastores 988 and 994 may be linked to, and thus organized around, each of the client devices 908. In such case, a unique identification is assigned to each client device 908. Thus, each of the unique identifications is linked within the memory apparatuses 924 and/or 944 to the corresponding client device's data. The unique identifications may be input by the user via the user interface 916 and/or the user interface 938, and may be stored by the processing apparatus 928 and/or the processing apparatus 948 in any of the datastores within the memory apparatus 924 and/or the memory apparatus 944. Furthermore, the user may also create linkages in the memory apparatus 924 and/or the memory apparatus 944 between the unique identifications and the data within the datastores utilizing the user interface 916 and/or the user interface 938.

As further illustrated by FIGS. 9*a* and 9*b* and as briefly mentioned above, the environment 900 includes the network scanner application 982, the quarantine tool application 984, the data source application 986, the compliance agent application 990, the data source application 992, the DHCP application 996, and the data source application 997. As used herein, the term "application" generally refers to computer-readable program code comprising computer-readable instructions and stored on a computer-readable medium, where the instructions instruct a processor to perform certain functions, such as logic functions, read and write functions, and/or the like. In this regard, each of the network scanner application 982, the quarantine tool application 984, the data source application 986, the compliance agent application 990, the data source application 992, the DHCP application 996, and the data source application 997 includes computer-readable instructions for instructing the respective processing apparatuses 928, 948, 972 and/or other devices to perform one or more of the functions described herein, such as one or more of the functions described in FIGS. 10*a-c*. While the network scanner application 982, the quarantine tool application 984, the data source application 986, the compliance agent application 990, the data source application 992, the DHCP application 996, and the data source application 997 are drawn as separate applications, it should be understood that the functions of the applications as described herein could be ascribed to any number of application, including a single application.

Figure 10A:
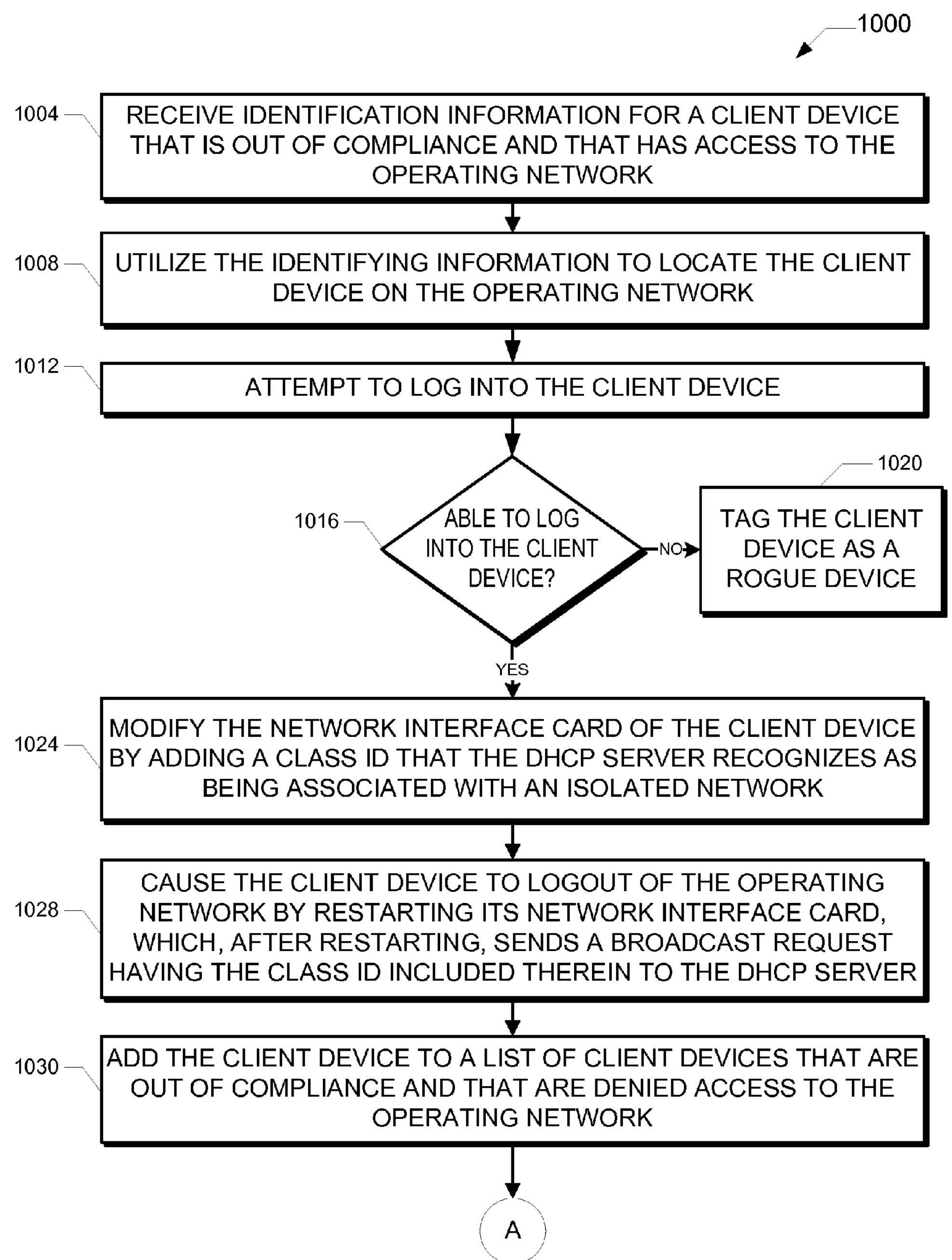
FIG. 10*a* provides part of a flow diagram illustrating an exemplary process implemented in the exemplary environment of FIGS. 9*a* and 9*b* for identifying, quarantining, and restoring out of compliance client devices, in accordance with an embodiment of the present invention.
Figure 10B:
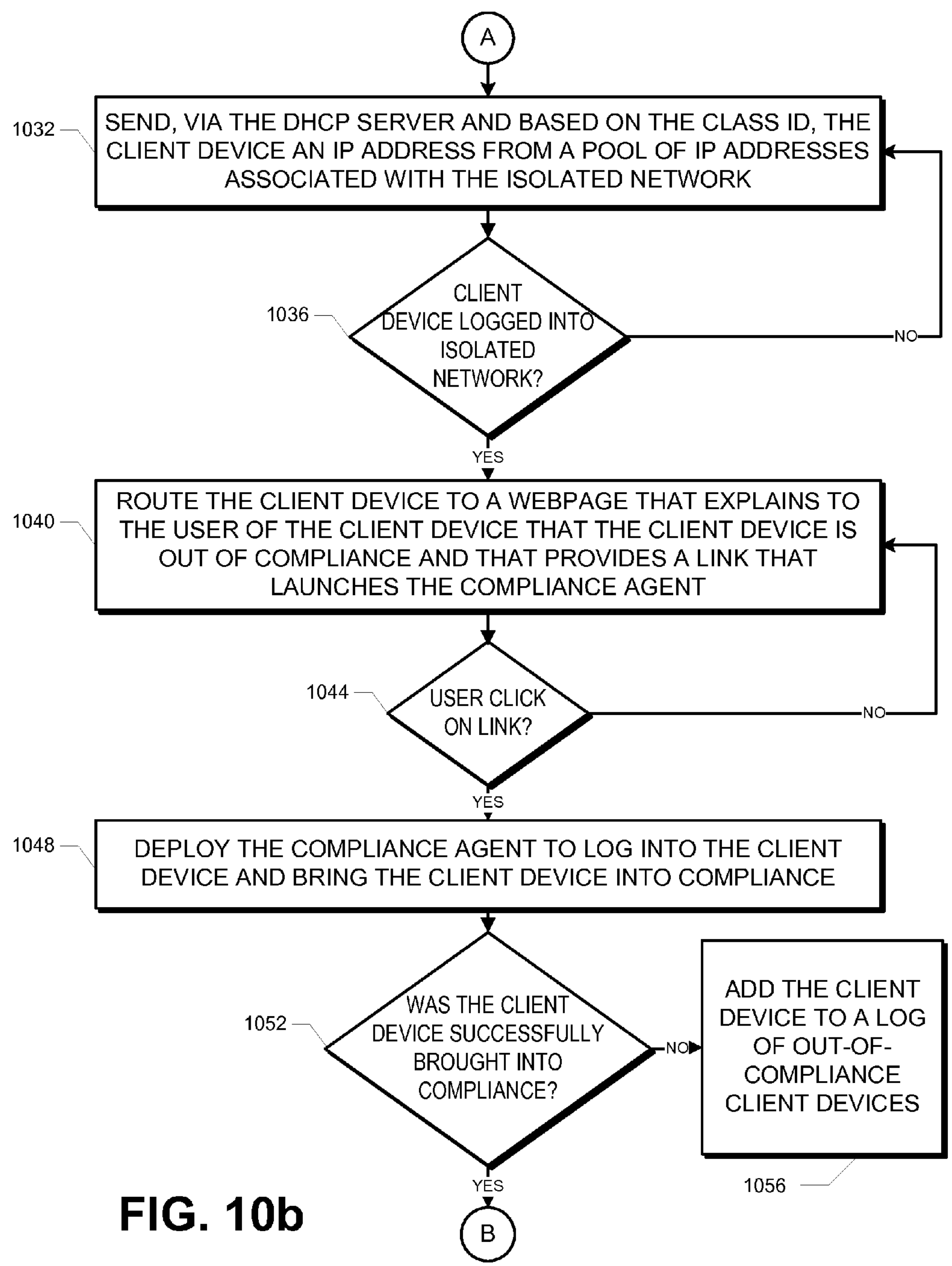
FIG. 10*b* provides a continuation of the flow diagram from FIG. 10*a* illustrating an exemplary process implemented in the exemplary environment of FIGS. 9*a* and 9*b* for identifying, quarantining, and restoring out of compliance client devices, in accordance with an embodiment of the present invention.
Figure 10C:
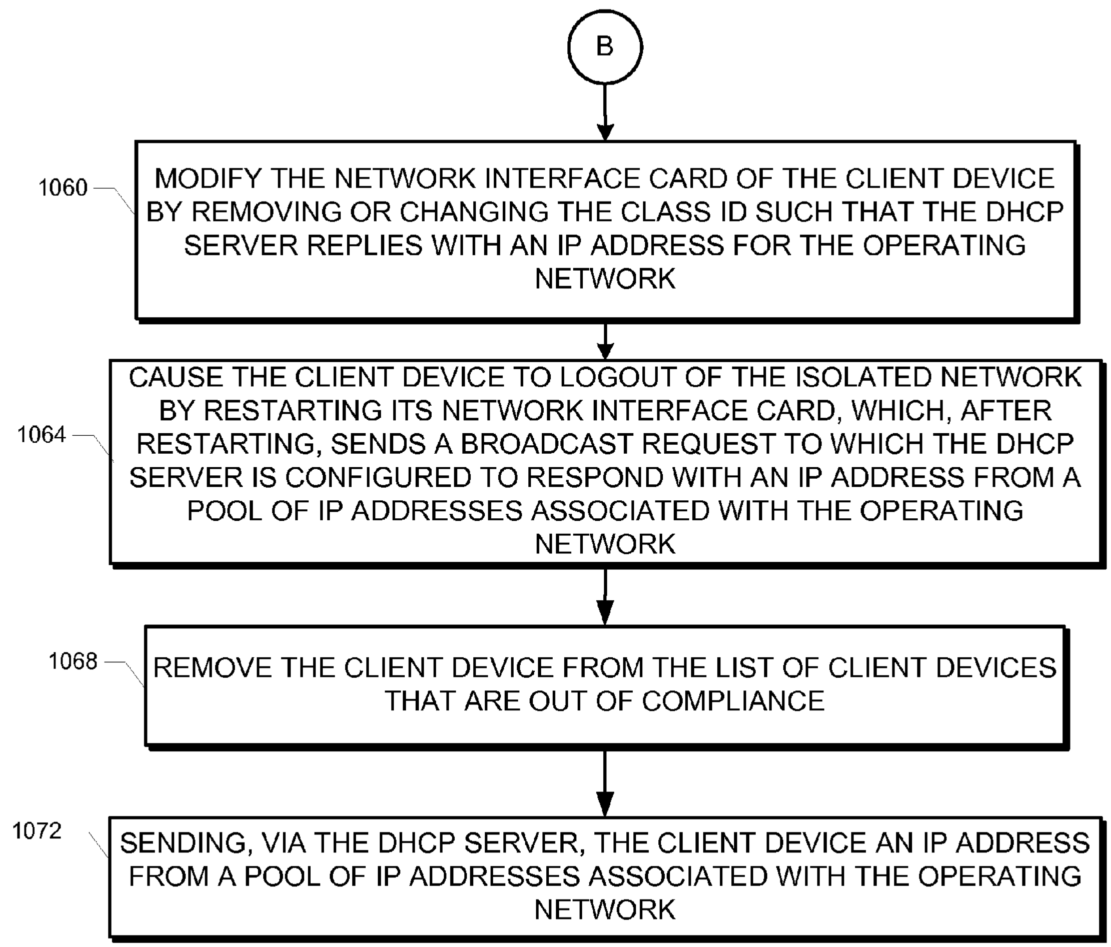
FIG. 10*c* provides a continuation of the flow diagrams from FIGS. 10*a* and 10*b* illustrating an exemplary process implemented in the exemplary environment of FIGS. 9*a* and 9*b* for identifying, quarantining, and restoring out of compliance client devices, in accordance with an embodiment of the present invention.

FIGS. 10*a*, 10*b*, and 10*c* provide a flow diagram illustrating an exemplary process implemented in the exemplary environment 900 of FIGS. 9*a* and 9*b* for identifying, quarantining, and restoring out of compliance client devices, in accordance with an embodiment of the present invention. As indicated by block 1004 the process 1000 generally begins with the quarantine server 912 receiving notification that the client device 908*a* is out of compliance. There exists a plurality of apparatuses, systems, and methods for identifying the client devices 108 that are out of compliance. For example, according to the illustrated embodiment, the network scanner application 982 of the quarantine server 912 crawls the operating network 904 and examines the plurality of client devices 908 residing on the operating network 904 to identify which client devices 908 are out of compliance. For example according to an embodiment, to determine whether a client device 908 is out of compliance, the network scanner application 982 logs into the client device and communicates with the application management software, such as IBM Tivoli® Composite Application Manager, running on the client device 908. For example, the network scanner application 982 reviews the log file of the application management software to determine whether the client device 908 is running the proper antivirus applications and has been update with the required patches. For each client device 908 that is found to be out of compliance, the network scanner application 982 records in the client device data 988 identification information about the client device 908. For example, the identification information could include: the MAC address 980 of the NIC 976 of the client device 508; the serial number of the NIC 976 or of the client device 908 itself; the IP address assigned to the client device 908 at the time it was identified as being out of compliance; and/or the like. Also, for example, the identification information could include the path of the client device 908 on the operating network 904.

According to some embodiments, after the network scanner application 982 records in the client device data 988 identification information about the client device 908*a* that is out of compliance, the network scanner application 920 notifies the quarantine tool application 984 that the client device 908*a* is out of compliance. According to some embodiments, the network scanner application 982 provides the quarantine tool application 988 with identification information about the client device 908*a*. According to other embodiments, the quarantine tool application 988 monitors the client device data 988 for updates and, upon the network scanner application 982 updating the client device data 988 with identification information for the client device 908*a* that was found to be out of compliance, the quarantine tool application 988 access the client device data 988 and obtains the identification information for the client device 908*a*.

After the quarantine tool application 984 receives notice of the client device 908*a* that is out of compliance and that has access to the operating network 904, the quarantine tool application 984, as indicated at block 1008 utilizes the identification application to locate the client device 908*a* on the operating network 904. Then, as indicated at block 1012, the quarantine tool application 984 attempts to log into the client device 908. As represented at decision block 1016, if the quarantine tool application 984 is unable to log into to the client device, then, as represented by block 1020, the quarantine tool application 984 tags the client device 908*a* as being a rogue device that does not have authorization to access the operating network 904. According to an embodiment, if the quarantine tool application 984 cannot access the client device 908*a*, then the client device 908*a* is not sanctioned by the administrator of the operating network 904 to access the operating network 904. According to the illustrated embodiment, client devices 908*a* that are tagged as rogue devices are cued for manual removal from the operating network 904.

Referring again to the decision block 1016, if the quarantine tool application 984 is able to log into the client device, then, as indicated at block 1024, the quarantine tool application 984 modifies the NIC 976 of the client device 908*a* by adding a Class ID that the DHCP server recognizes as being associated with the isolated network 936. Next, as indicated at block 1028, the quarantine tool application 984 restarts the NIC 976 of the client device 908*a* and, as indicated at block 1030, updates the client device data 988 to indicate that the Class ID has been added to the NIC 976 of the client device 908*a* and that the NIC 976 was restarted after the Class ID was added.

Restarting the NIC 976 causes the client device 908*a* to log out of the operating network 904. After restarting, the NIC 976 broadcasts a request that includes the Class ID. The DHCP application 996, upon receiving the broadcast via the network interface 964, searches the configuration information 998 to determine what network access if any should be provided to the client device 908*a*. For example, the DHCP application 996 searches the configuration information 998 to locate an access code that matches the Class ID. If a match is located, then the DHCP application receives instruction to provide the client device an IP address from a pool of IP address that is associated with the isolated network 936. As such, as indicated at block 1032, the DHCP server 952 sends a response to the broadcast request of the client device 908*a* with an IP address to the isolated network 936.

For example, as implemented in some embodiments of the invention, the DHCP servers have pools of IP addresses, or other identifiers in other embodiments, that are recognized either as originally associated with specific Class IDs or that can be assigned to specific Class IDs. The Class IDs can be used by the DHCP server to identify client devices as belonging to a specific class. In some embodiments a Class ID specifically related to quarantined client devices can be created, such as a Quarantine Class ID. Therefore, when the quarantine tool identifies a non compliant client device the quarantine tool modifies the NIC of the non compliant client device by adding the Quarantine Class ID, IP address associated with the Quarantine Class ID, or other identifier associated with the Quarantine Class ID to the non compliant client device. Thereafter, the quarantine tool forces the non compliant client device to log out of the operating network and re-log back into a network. When the non compliant client device asks the DHCP server for another IP address to re-log back into a network the DHCP server identifies that the non compliant device is assigned a Quarantine Class ID, and thus, assigns an IP address from the Quarantine Class ID pool. The IP address from the Quarantine Class ID pool will not let the non compliant client device log into the network. Instead the IP address from the Quarantine Class ID pool will only allow the client device to log into the isolated network. The Class ID in other embodiments does not have to be a pool of IP addresses. In some embodiments it can be any other identifier that is assigned and recognized by the DHCP server, or other server, which directs the DHCP server, or other server, to prevent the non compliant client device from accessing the operating network and instead directs the non compliant client device to an isolated network.

Next, as represented at decision block 1036, if the client device 908*a* logs into the isolated network 936, then the web server application 991 routes the client device to an out of compliance webpage 995, as indicated by block 1040. In one embodiment, the only webpage that the web server application 991 provides the client device 908*a* with access to is the out of compliance webpage 995. For example, if the user of the client device 908*a* were to type in the URL of a website on the Internet, the isolation server 932 prevents the client device 908*a* from accessing the Internet and routes the client device 908*a* to the out of compliance webpage 995, which provides a link that launches the compliance agent application 990. As represented at decision block 1044, if the user clicks on the link that launches the compliance agent application 990, then the compliance agent application 990 launches and then logs into the client device 908*a*, as indicated by block 1040. In other embodiments, the isolation server 932 installs the compliance agent application 990 automatically, without requiring the user to click on the webpage 995.

The compliance agent application 990, after logging into the client device 908*a*, attempts to bring the client device 908*a* into compliance. For example, the compliance agent application 990 installs the necessary patches and antivirus applications. Then, as indicated by block 1052, if the client device 908*a* was not successfully brought back into compliance, the compliance agent application 990 adds the client device 908*a* to a log of out of compliance devices in the out of compliance data 994, as indicated by block 1054. Referring again to decision block 1052, if the client device 908*a* was brought into compliance, then the compliance agent application 990, as indicated by block 1060, modifies the NIC 976 of the client device 908*a* by removing or changing the Class ID such that the DHCP server recognizes the broadcast of the client device as being associated with the operating network 904. According to some embodiments, if the client device 908*a* was not successfully brought back into compliance, the compliance agent application 990 is installed on the client device 908*a* and monitors the client device 908*a* until the client device 908*a* is brought into compliance. According to this embodiment, once the installed compliance agent detects that the client device 908*a* has been brought into compliance, then the installed compliance agent, as represented by block 1060 modifies the NIC 976 of the client device 908*a* by removing or changing the Class ID.

Next, as indicated at block 1064, the compliance agent application 990 restarts the NIC 976 of the client device 908*a* and, as indicated at block 1068, removes the client device 908*a* from the log of out of compliance client devices and updates the out of compliance data 994 to indicate that: the client device 908*a* has been restored; the Class ID of the NIC 976 of the client device 908*a* has been removed or changed; and the NIC 976 was restarted after the Class ID was removed or changed. Restarting the NIC 976 causes the client device 908*a* to log out of the isolated network 936. After restarting, the NIC 976 broadcasts a request. The DHCP application 996, upon receiving the broadcast via the network interface 964, searches the configuration information 998 to determine what network access if any should be provided to the client device 908*a*. For example, the DHCP application 996 searches the configuration information 998 to locate an access code that matches the broadcast request. Once the match is located, then the DHCP application receives instruction to provide the client device an IP address from a pool of IP addresses that are associated with the operating network 904. As such, as indicated at block 1072, the DHCP server 952 sends a response to the broadcast request of the client device 908*a* with an IP address to the operating network 904. According to some embodiments, after the client device 908*a* logs onto the operating network 904, the network scanner application 982, upon recognizing that the client device 908*a* has been restored, updates the client device data 988 accordingly.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

U.S. patent application Ser. No. 12/847,411 to Kaye et al. and entitled "Compliance Tool" is filed concurrently with the present application and is hereby incorporated by reference in its entirety.

The invention claimed is:

1. A system for quarantining an out of compliance client device from other client devices on an operating network, the system comprising;

a memory device;

a communication device; and a first processing device operatively coupled to the memory device and the communication device, wherein the first processing device is configured to execute computer-readable program code associated with a quarantine tool to access the out of compliance client device via the operating network, wherein the quarantine tool comprises computer readable program code configured when performed by said first processing device to cause said first processing device to:

receive identification information for the out of compliance client device from a scanner application, wherein the scanner application scans an operating network for the Out of compliance client device from a plurality of client devices;

locate the out of compliance client device using the identification information from the scanner application;

attempt to log into the out of compliance client device;

tag the out of compliance client device as being a rogue device and cue the out of compliance client device for manual removal from the operating network when the attempt to log into the out of compliance client device fails;

modify the out of compliance client device when the attempt to log into the out of compliance client device succeeds, wherein modifying the out of compliance client device comprises adding or changing a class ID associated with a network interface of the out of compliance device, wherein the class ID is added or changed to an isolated network class ID associated with an isolated network, wherein class IDs are identifiers associated with a pool of IP addresses for client devices and are related to networks that the client devices are allowed to access;

cause the out of compliance client device to logout of the operating network and request to log into the isolated network using the isolated network class ID by restarting the network interface; and wherein the isolated network class ID allows the network interface to broadcast a request for configuration information associated with the isolated network and wherein a DHCP recognizes the isolated network class ID in the broadcast, identifies a matching access code for the isolated network, and provides an IP address for the isolated network with the matching access code, which allows the out of compliance device to log into the isolated network.

2. The system of claim 1, wherein the network interface comprises a network interface card (NIC).

3. The system of claim 1, wherein the quarantine tool comprises computer readable program code that when performed by said first processing device causes said first processing device to cause the out of compliance client device to broadcast the request for configuration information associated with an isolated network is further configured to cause the out of compliance client device to thereafter receive configuration information associated with the isolated network from a network server configured to respond to the broadcast request.

4. The system of claim 1, further comprising a second processing device configured to execute computer-readable program code associated with a compliance tool to bring the out of compliance client device into compliance via the isolated network, wherein the compliance tool comprises computer readable program code configured when performed by said second processing device to cause said processing device to:

determine that an out of compliance client device is now a compliant client device;

cause the compliant client device to broadcast a request for configuration information to connect to the operating network; and cause the compliant client device to logout of the isolated network.

5. The system of claim 4, wherein the compliance tool comprises computer readable program code that when performed by said second processing device causes said second processing device to:

add the out of compliance client device to a log of out of compliance devices when the out of compliance client device cannot be made compliant.

6. The system of claim 5, wherein the compliance tool comprises computer readable program code that when performed by said second processing device causes said second processing device to:

access the log of out of compliance client devices;

retrieve identification information for each out of compliance client device listed in the log of out of compliance devices and that are quarantined from the operating network;

utilize the identification information to access each out of compliance client device listed in the log of out of compliance devices;

identify one or more client devices listed in the log of out of compliance devices that has been changed into the compliant client device;

cause the compliant client device to broadcast a request for configuration information associated with the operating network; and log the compliant client device out of the isolated network.

7. The system of claim 4, wherein the compliance tool is a compliance agent, wherein at least portions thereof are installed on the out of compliance client device.

8. The system of claim 7, wherein the compliance agent comprises computer readable program code that when performed by said second processing device causes said second processing device to:

evaluate the out of compliance client device to determine if it has been brought into compliance.

9. The system of claim 7, wherein the compliance agent comprises computer readable program code that when performed by said second processing device causes said second processing device to:

uninstall the compliance agent once the out of compliance client device has been made compliant.

10. The system of claim 4, wherein the compliance agent comprises computer readable program code that when performed by said second processing device causes said second processing device to cause the compliant client device to broadcast the request for configuration information associated with the operating network is further configured to cause the compliant client device to thereafter receive configuration information associated with the operating network from a network server configured to respond to the broadcast request.

11. The system of claim 4, wherein the compliance agent comprises computer readable program code that when performed by said second processing device causes said second processing device to cause a modification in the compliant client device by removing or changing a Class ID from or on the network interface of the compliant client device such that the compliant client device broadcasts a request for configuration information, wherein the broadcasted request either does not include the Class ID or includes the changed Class ID, and whereby the compliant client device thereafter receives an IP address from a pool of IP addresses associated with the operating network from a network server configured to respond to the broadcast request.

12. The system of claim 4, wherein the compliance tool comprises computer readable program code that when performed by said second processing device causes said second processing device to cause said second processing device to cause the client device that has been brought into compliance to logout of the isolated network by restarting a network interface of the client device.

13. The system of claim 4, wherein the compliance tool comprises computer readable program code that when performed by said second processing device causes said second processing device to:

receive notification that the out of compliance client device is out of compliance when the out of compliance client device accesses the isolated network.

14. The system of claim 4, wherein the compliance tool comprises computer readable program code that when performed by said second processing device causes said second processing device to:

receive identification information and location information for the out of compliance client device, wherein the identification information is an IP address associated with the out of compliance device and the location information is a path to the out of compliance device to the isolated network; and wherein the second processing device configured to execute computer-readable program code to utilize a compliance tool comprises utilizing the identification information and the location information to access the out of compliance client device.

15. The system of claim 4, wherein said first and second processing devices are embodied by the same processing device.

16. The system of claim 7, further comprising a third processing device configured to execute computer-readable program code associated with the compliance agent that is at least partially installed on the out of compliance client device, wherein the third processing device is configured to execute the portions of the compliance agent that are installed on the out of compliance client device.

17. A method for quarantining an out of compliance client device from other client devices on an operating network, the method comprising:

receiving, by a processor, identification information for the out of compliance client device from a scanner application, wherein the scanner application scans an operating network for the out of compliance client device from a plurality of client devices;

locating, by the processor, the out of compliance client device using the identification information from the scanner application;

attempting, by the processor, to log into the out of compliance client device;

tagging, by the processor, the out of compliance client device as being a rogue device and cue the out of compliance client device for manual removal from the operating network when the attempt to log into the out of compliance client device fails;

modifying, by the processor, the out of compliance client device when the attempt to log into the out of compliance client device succeeds, wherein modifying the out of compliance client device comprises adding or changing a class ID associated with a network interface of the out of compliance device, wherein the class ID is added or changed to an isolated network class ID associated with an isolated network, wherein class IDs are identifiers associated with a pool of IP addresses for client devices and are related to networks that the client devices are allowed to access;

causing, by the processor, the out of compliance client device to logout of the operating network and request to log into the isolated network using the isolated network class ID by restarting the network interface; and wherein the isolated network class ID allows the network interface to broadcast a request for configuration information associated with the isolated network and wherein a DHCP recognizes the isolated network class ID in the broadcast, identifies a matching access code for the isolated network, and provides an IP address for the isolated network with the matching access code, which allows the out of compliance device to log into the isolated network.

18. The method of claim 17, wherein the network interface comprises a network interface card (NIC).

19. The method of claim 17, further comprising causing the out of compliance client device to receive configuration information associated with the isolated network from a network server configured to respond to the broadcast request, through the use of the processor.

20. The method of claim 17, further comprising:

determining that an out of compliance client device is now a compliant client device, through the use of the processor;

causing the compliant client device to broadcast a request for configuration information to connect to the operating network, through the use of the processor; and causing the compliant client device to logout of the isolated network, through the use of the processor.

21. The method of claim 20, further comprising:

adding the out of compliance client device to a log of out of compliance devices when the out of compliance client device cannot be made compliant, through the use of the processor.

22. The method of claim 21, further comprising:

accessing the log of out of compliance client devices, through the use of the processor;

retrieving identification information for each out of compliance client device listed in the log of out of compliance devices and that are quarantined from the operating network, through the use of the processor;

utilizing the identification information to access each out of compliance client device listed in the log of out of compliance devices, through the use of the processor;

identifying one or more client devices listed in the log of out of compliance devices that has been changed into the compliant client device, through the use of the processor;

causing the compliant client device to broadcast a request for configuration information associated with the operating network, through the use of the processor; and logging the compliant client device out of the isolated network, through the use of the processor.

23. The method of claim 20, further comprising:

evaluating the out of compliance client device to determine if it has been brought into compliance, through the use of the processor.

24. The method of claim 20, further comprising:

causing the compliant client device to receive configuration information associated with the operating network from a network server configured to respond to the broadcast request, through the use of the processor.

25. The method of claim 20, further comprising:

causing a modification in the compliant client device by removing or changing a Class ID from or on the network interface of the compliant client device such that the compliant client device broadcasts a request for configuration information, through the use of a processor, wherein the broadcasted request either does not include the Class ID or includes the changed Class ID, and whereby the compliant client device thereafter receives an IP address from a pool of IP addresses associated with the operating network from a network server configured to respond to the broadcast request.

26. The method of claim 20, wherein causing the client device that has been brought into compliance to logout of the isolated network comprises restarting a network interface of the client device.

27. The method of claim 20, further comprising:

receiving notification that the out of compliance client device is out of compliance when the out of compliance client device accesses the isolated network, through the use of the processor.

28. The method of claim 20, further comprising:

receiving identification information and location information for the out of compliance client device, wherein the identification information is an IP address associated with the out of compliance device and the location information is a path to the out of compliance device to the isolated network; and utilizing the identification information and the location information to access the out of compliance client device.

29. The method of claim 17, wherein the steps performed by the processor are performed by more than one processor.

30. A computer program product for a system for quarantining an out of compliance client device from other client devices on a network, the computer program product comprising at least one non-transitory computer-readable medium having computer-readable program code portions embodied therein, the computer-readable program code portions comprising:

an executable portion configured for receiving identification information for the out of compliance client device from a scanner application, wherein the scanner application scans an operating network for the out of compliance client device from a plurality of client devices;

an executable portion configured for locating, by the processor the out of compliance client device using the identification information from the scanner application;

an executable portion configured for attempting to log into the out of compliance client device;

an executable portion configured for tagging the out of compliance client device as being a rogue device and cue the out of compliance client device for manual removal from the operating network when the attempt to log into the out of compliance client device fails;

an executable portion configured for modifying the out of compliance client device when the attempt to log into the out of compliance client device succeeds, wherein modifying the out of compliance client device comprises adding or changing a class ID associated with a network interface of the out of compliance device, wherein the class ID is added or changed to an isolated network class ID associated with an isolated network, wherein class IDs are identifiers associated with a pool of IP addresses for client devices and are related to networks that the client devices are allowed to access;

an executable portion configured for causing the out of compliance client device to logout of the operating network and request to log into the isolated network using the isolated network class ID by restarting the network interface; and wherein the isolated network class ID allows the network interface to broadcast a request for configuration information associated with the isolated network and wherein a DHCP recognizes the isolated network class ID in the broadcast, identifies a matching access code for the isolated network, and provides an IP address for the isolated network with the matching access code, which allows the out of compliance device to log into the isolated network.

31. The computer program product of claim 30, wherein the network interface comprises a network interface card (NIC).

32. The computer program product of claim 30, further comprising an executable portion configured for causing the out of compliance client device to receive configuration information associated with the isolated network from a network server configured to respond to the broadcast request.

33. The computer program product of claim 30, further comprising:

an executable portion configured for determining that an out of compliance client device is now a compliant client device;

an executable portion configured for causing the compliant client device to broadcast a request for configuration information to connect to the operating network; and an executable portion configured for causing the compliant client device to logout of the isolated network.

34. The computer program product of claim 30, further comprising:

an executable portion configured for adding the out of compliance client device to a log of out of compliance devices when the out of compliance client device cannot be made compliant.

35. The computer program product of claim 34, further comprising:

an executable portion configured for accessing the log of out of compliance client devices;

an executable portion configured for retrieving identification information for each out of compliance client device listed in the log of out of compliance devices and that are quarantined from the operating network;

an executable portion configured for utilizing the identification information to access each out of compliance client device listed in the log of out of compliance devices;

an executable portion configured for identifying one or more client devices listed in the log of out of compliance devices that has been changed into the compliant client device;

an executable portion configured for causing the compliant client device to broadcast a request for configuration information associated with the operating network; and an executable portion configured for logging the compliant client device out of the isolated network.

36. The computer program product of claim 33, further comprising:

an executable portion configured for evaluating the out of compliance client device to determine if it has been brought into compliance.

37. The computer program product of claim 33, further comprising:

an executable portion configured for causing the compliant client device to receive configuration information associated with the operating network from a network server configured to respond to the broadcast request.

38. The computer program product of claim 33, further comprising:

an executable portion configured for causing a modification in the compliant client device by removing or changing a Class ID from or on the network interface of the compliant client device such that the compliant client device broadcasts a request for configuration information, wherein the broadcasted request either does not include the Class ID or includes the changed Class ID, and whereby the compliant client device thereafter receives an IP address from a pool of IP addresses associated with the operating network from a network server configured to respond to the broadcast request.

39. The computer program product of claim 33, wherein the executable portion configured for causing the client device that has been brought into compliance to logout of the isolated network by restarting a network interface of the client device.

40. The computer program product of claim 33, further comprising:

an executable portion configured for receiving notification that the out of compliance client device is out of compliance when the out of compliance client device accesses the isolated network.

41. The computer program product of claim 33, further comprising:

an executable portion configured for receiving identification information and location information for the out of compliance client device, wherein the identification information is an IP address associated with the out of compliance device and the location information is a path to the out of compliance device to the isolated network; and an executable portion configured for utilizing the identification information and the location information to access the out of compliance client device.

* * * * *